United States Patent
Moshfeghi-Nejad

(10) Patent No.: US 10,661,192 B2
(45) Date of Patent: May 26, 2020

(54) STRUCTURAL BASIC UNITS AND THEIR CONNECTIVITY DEVICES

(71) Applicant: Fariborz Moshfeghi-Nejad, North Ryde (AU)

(72) Inventor: Fariborz Moshfeghi-Nejad, North Ryde (AU)

(73) Assignee: Fariborz Moshfeghi-Nejad (AU)

( * ) Notice: Subject to any disclaimer, the term of this patent is extended or adjusted under 35 U.S.C. 154(b) by 442 days.

(21) Appl. No.: 15/454,115

(22) Filed: Mar. 9, 2017

(65) Prior Publication Data

US 2018/0258967 A1 Sep. 13, 2018

(51) Int. Cl.
*F16B 17/00* (2006.01)
*A63H 33/08* (2006.01)
*A63H 33/10* (2006.01)

(52) U.S. Cl.
CPC ......... *A63H 33/088* (2013.01); *A63H 33/086* (2013.01); *A63H 33/108* (2013.01); *F16B 17/00* (2013.01); *Y10T 403/342* (2015.01)

(58) Field of Classification Search
CPC .. A63H 33/086; A63H 33/088; A63H 33/108; E04B 1/1903; E04B 1/1906; E04B 2001/1966; E04B 2001/1972; E04B 2001/2676; F16B 7/048; F16B 17/00; G09B 23/26; Y10T 403/342; Y10T 403/347
USPC ................................................. 403/171, 176
See application file for complete search history.

(56) References Cited

U.S. PATENT DOCUMENTS

| | | | | |
|---|---|---|---|---|
| 3,632,147 A | * | 1/1972 | Finger | E04B 1/1906 403/171 |
| 3,921,360 A | * | 11/1975 | Baldwin | E04B 1/1906 403/171 |
| 4,129,975 A | * | 12/1978 | Gabriel | A63H 33/101 403/171 |
| D257,365 S | * | 10/1980 | Gabriel | A63H 33/101 D21/502 |
| 5,007,220 A | * | 4/1991 | Lalvani | E04B 1/19 403/171 |
| 5,051,019 A | * | 9/1991 | Kohl | E04B 1/1906 403/171 |
| RE33,785 E | * | 12/1991 | Hildebrandt | A63H 33/04 434/211 |
| 5,265,395 A | * | 11/1993 | Lalvani | B44C 3/123 403/176 |
| 6,672,789 B2 | * | 1/2004 | Chen | F16B 7/185 403/171 |
| 6,840,699 B2 | * | 1/2005 | Rogers | F16B 7/044 403/171 |
| 10,327,545 B2 | * | 6/2019 | McPhillips | A47B 47/0091 |
| 2006/0053729 A1 | * | 3/2006 | Wallner | E04B 1/585 52/655.1 |

(Continued)

FOREIGN PATENT DOCUMENTS

WO WO-9010126 A1 * 9/1990 ........... E04B 1/1906

*Primary Examiner* — Josh Skroupa
(74) *Attorney, Agent, or Firm* — MaxValueIP LLC

(57) ABSTRACT

A connector joint device for connecting rods or arms at a joint or intersection. The connector joint includes more than one hexagon shape faces, more than one octagon shape faces, more than one 4-sided polygon shape faces. A first face among the more than one octagon shape faces has a hole extending in a direction at an angle with respect to a perpendicular line to the first face.

16 Claims, 44 Drawing Sheets

(56) References Cited

U.S. PATENT DOCUMENTS

2015/0059827 A1\* 3/2015 Reed ....................... H02S 20/32
136/246

\* cited by examiner

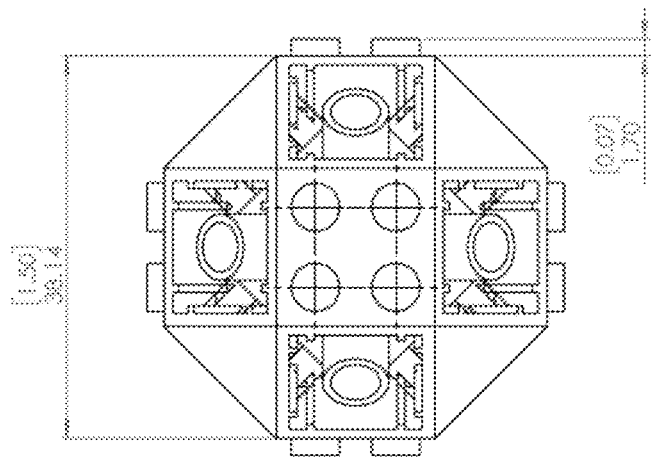
Figure 1-A
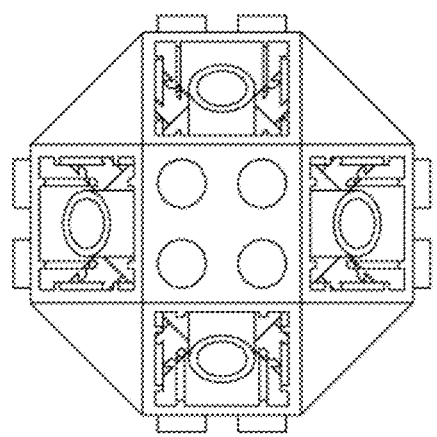
Figure 1-B

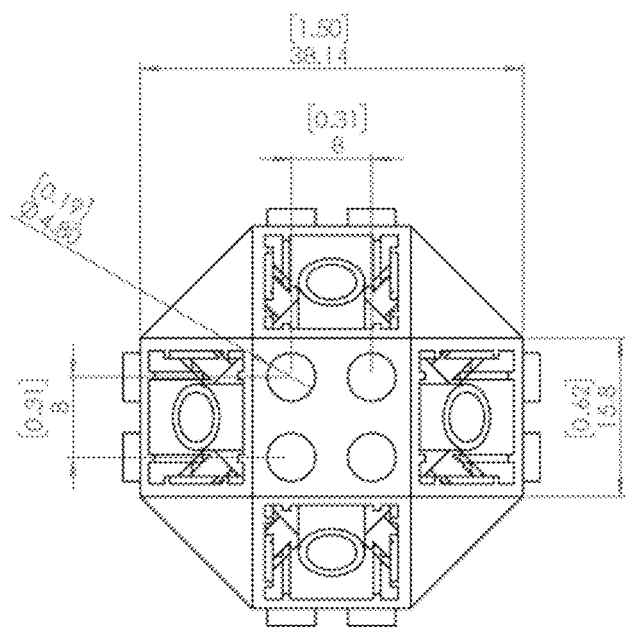
Figure 1-C
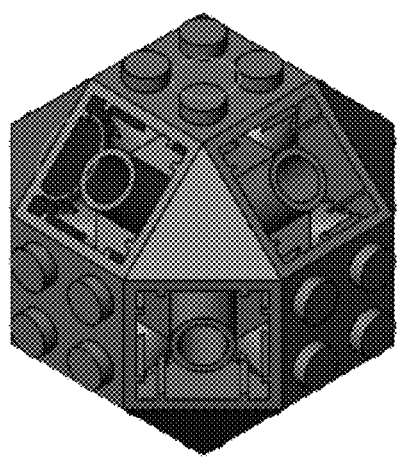
Figure 1-D

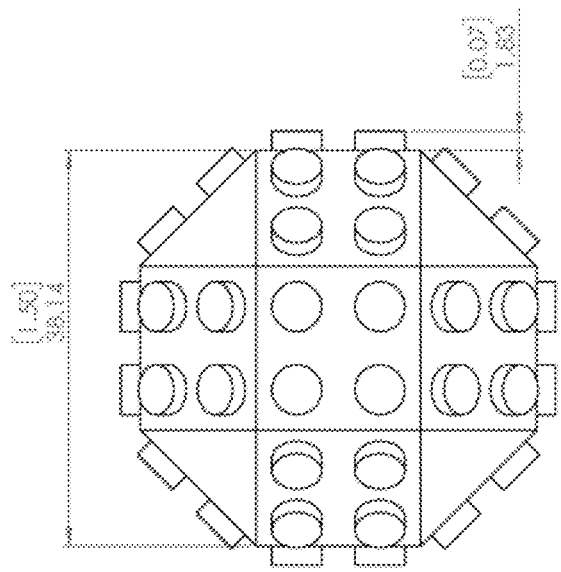
Figure 2-A
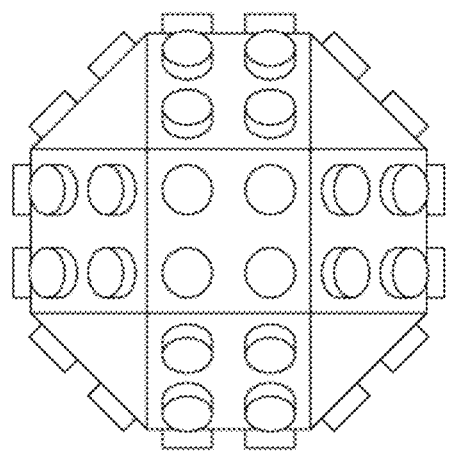
Figure 2-B

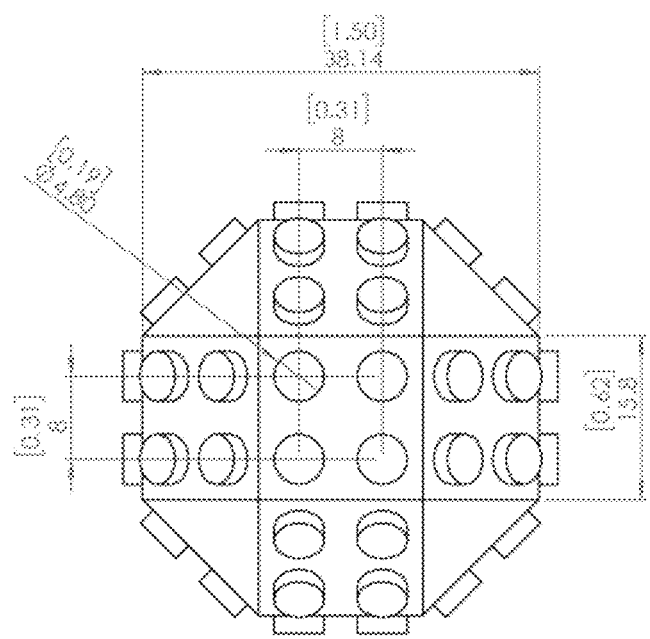
Figure 2-C
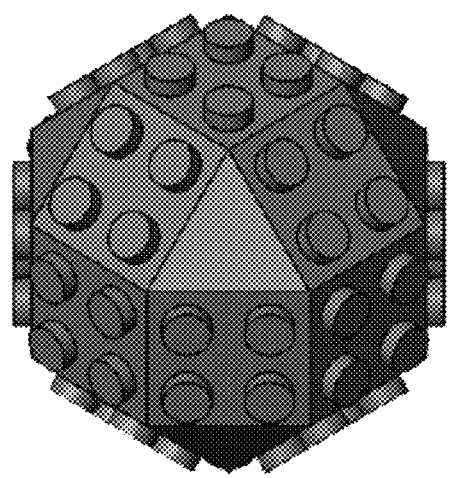
Figure 2-D

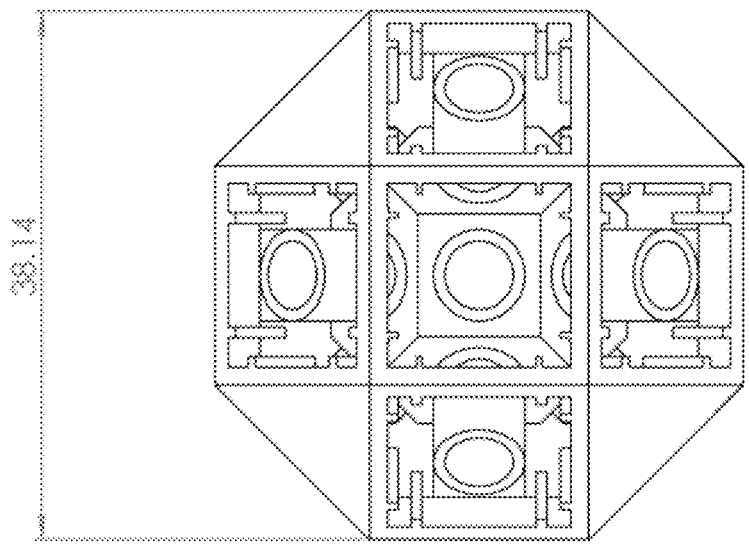
Figure 3-A
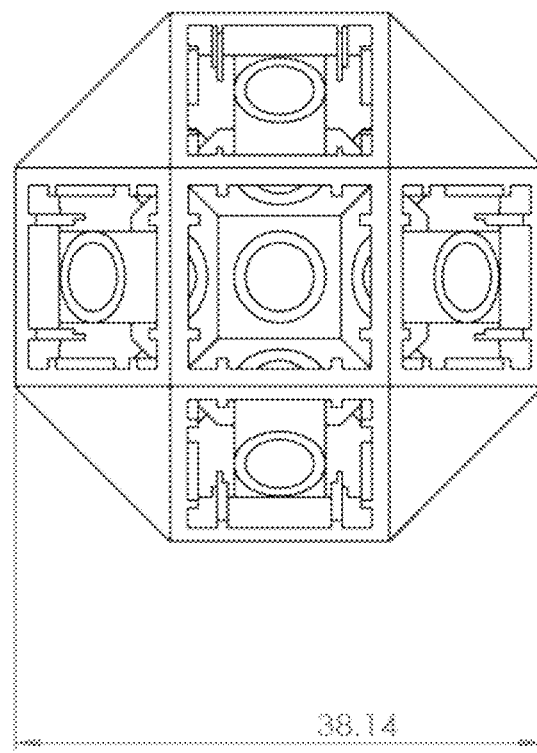
Figure 3-B

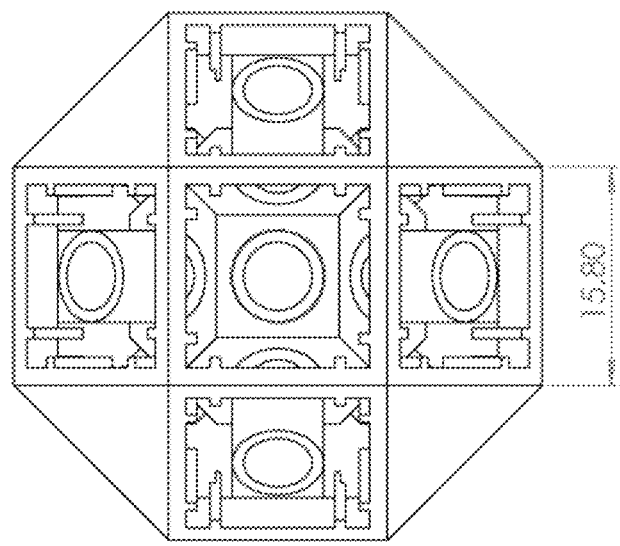
Figure 3-C
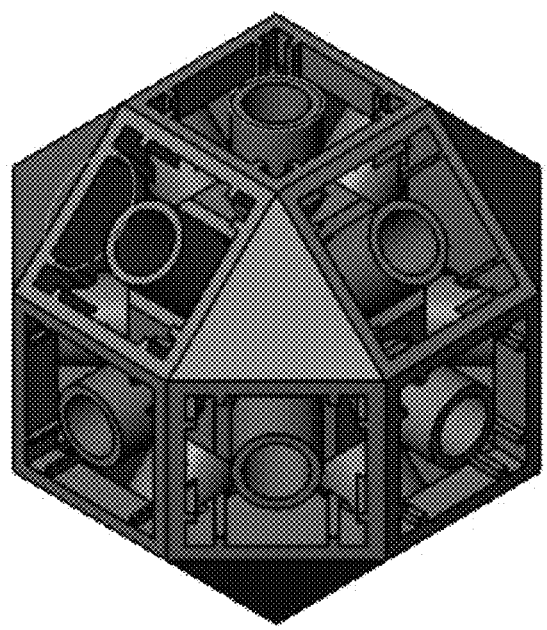
Figure 3-D

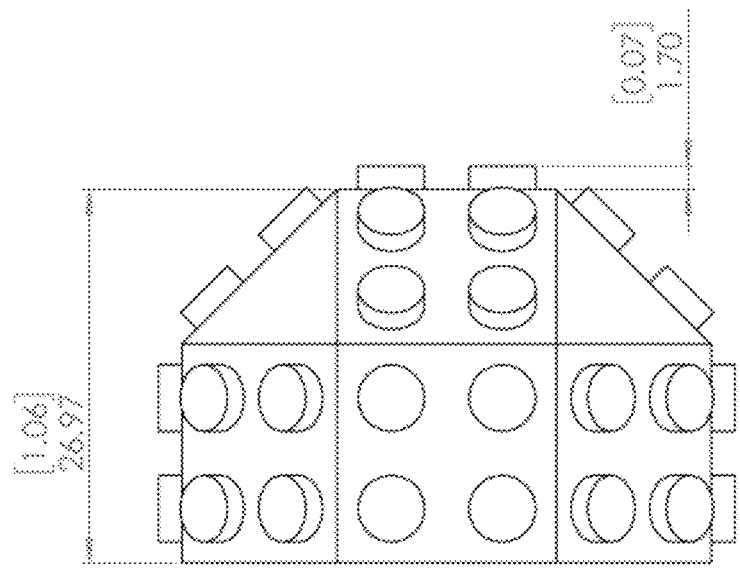
Figure 4-A
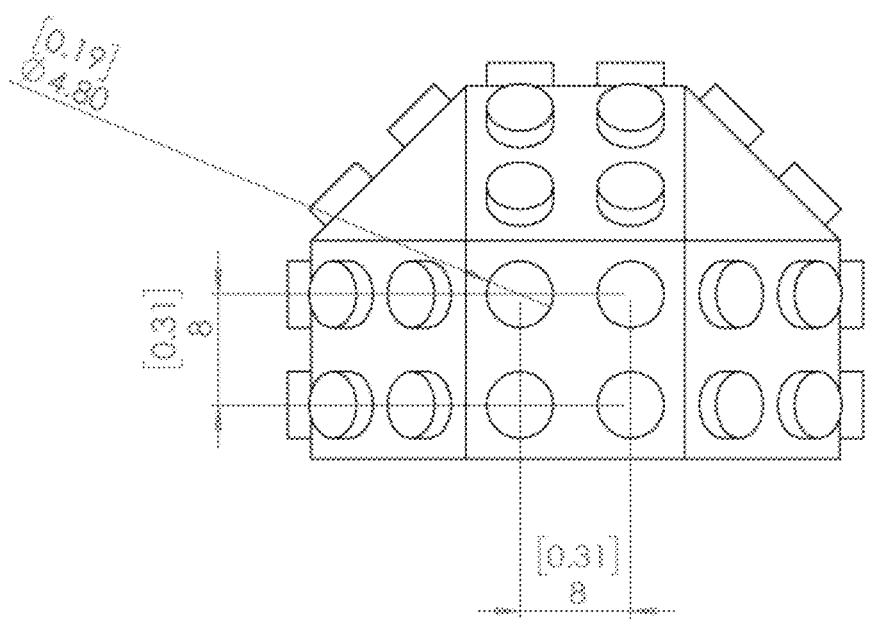
Figure 4-B

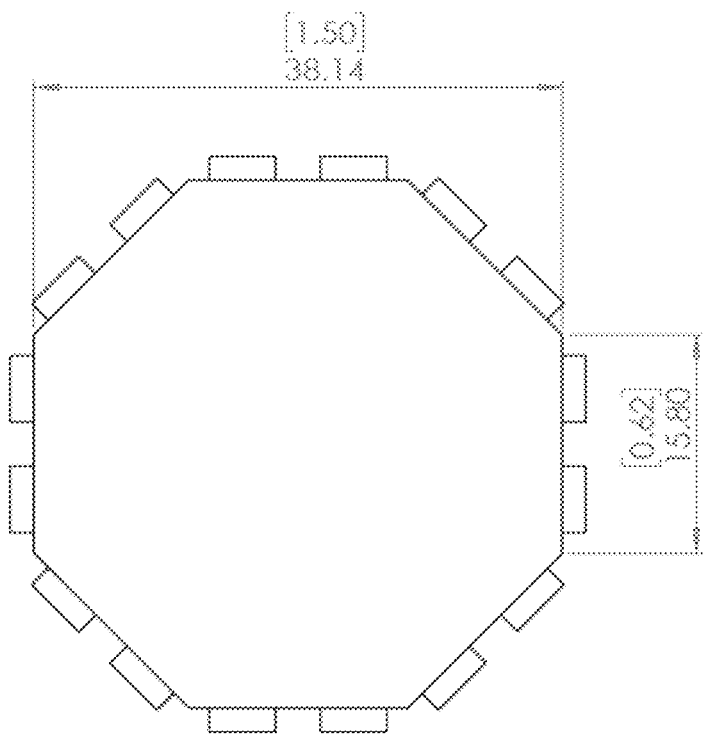
Figure 4-C
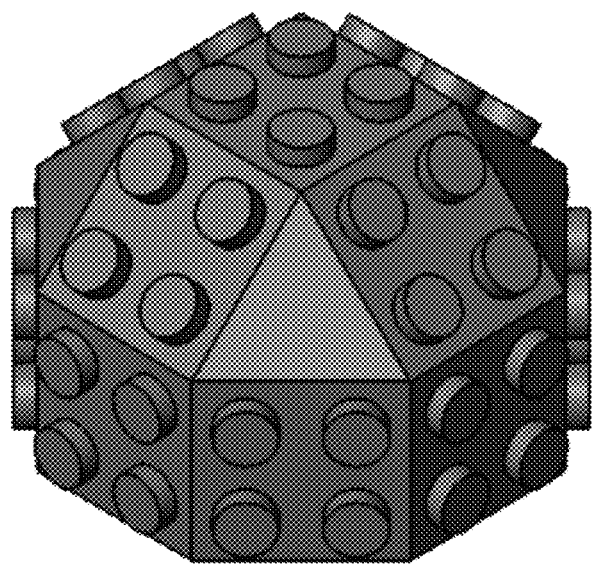
Figure 4-D

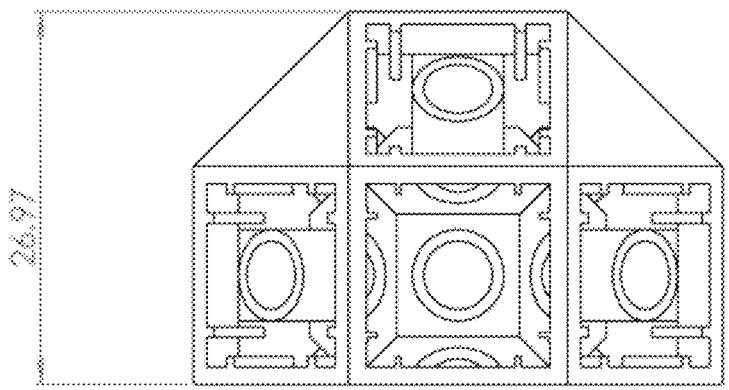
Figure 5-A
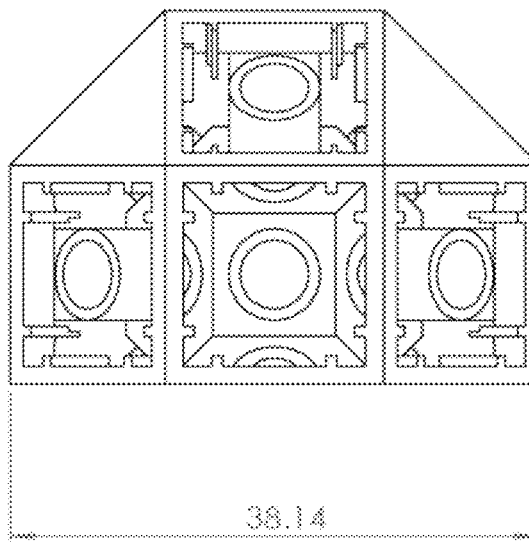
Figure 5-B

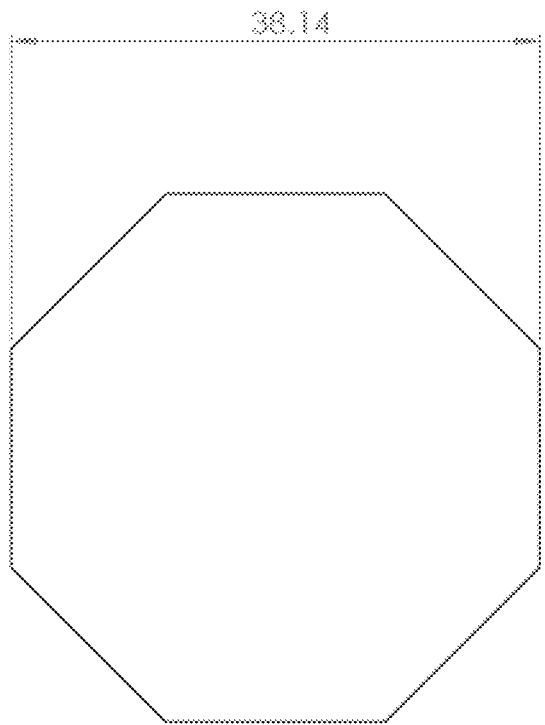
Figure 5-C
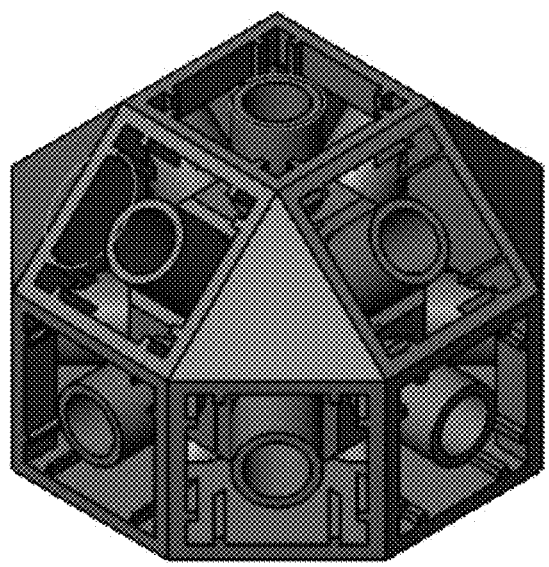
Figure 5-D

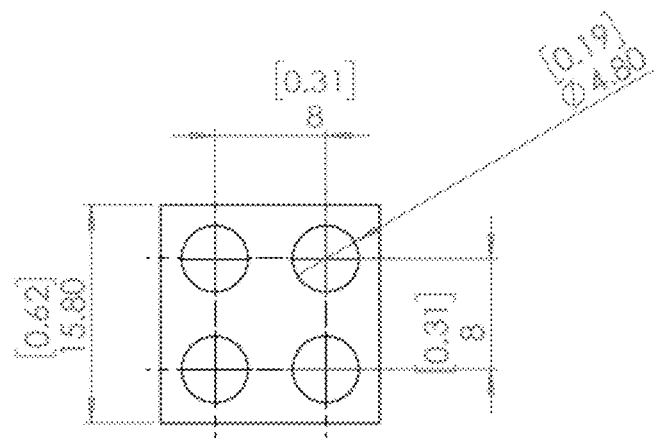
Figure 6-A
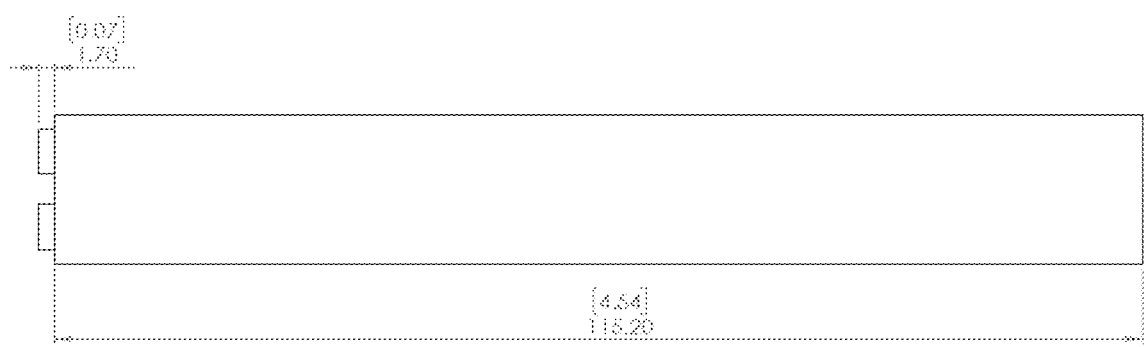
Figure 6-B

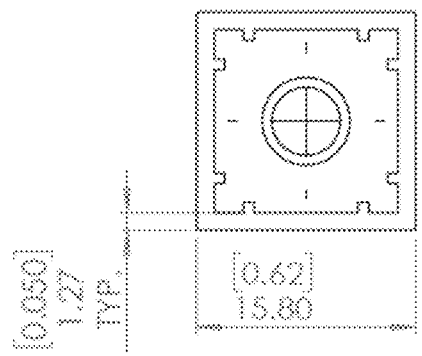
Figure 6-C
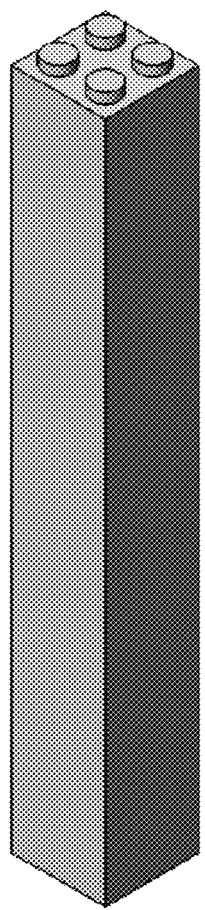
Figure 6-D

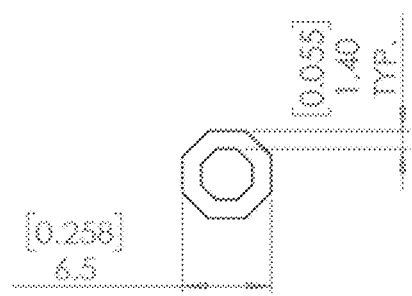
Figure 7-A
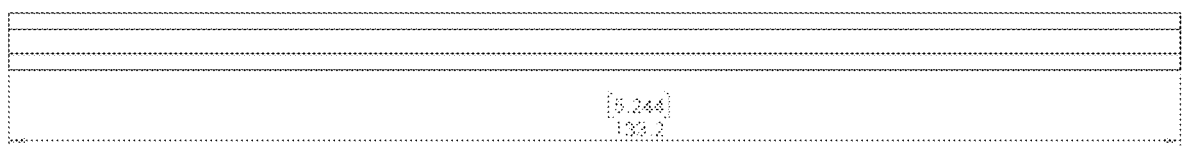
Figure 7-B

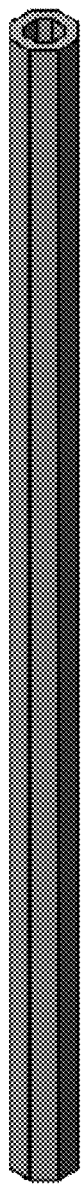
Figure 7-C

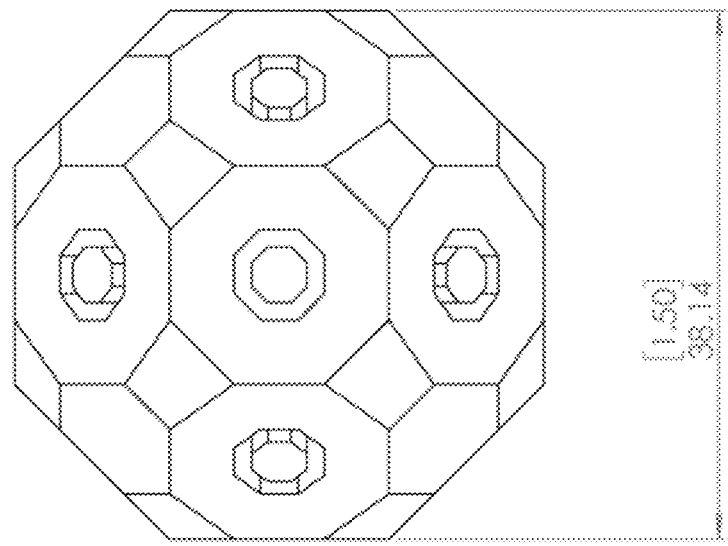
Figure 8-A
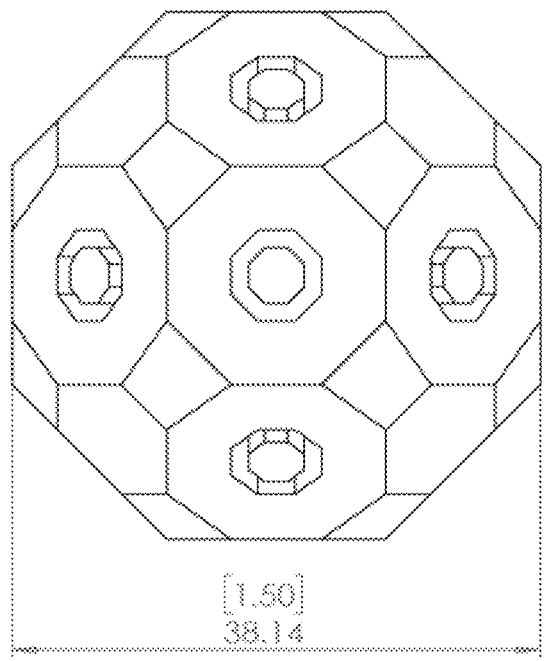
Figure 8-B

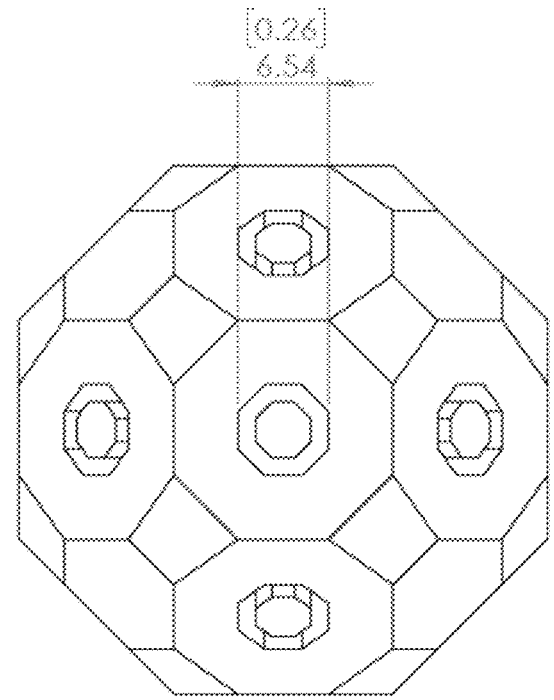
Figure 8-C
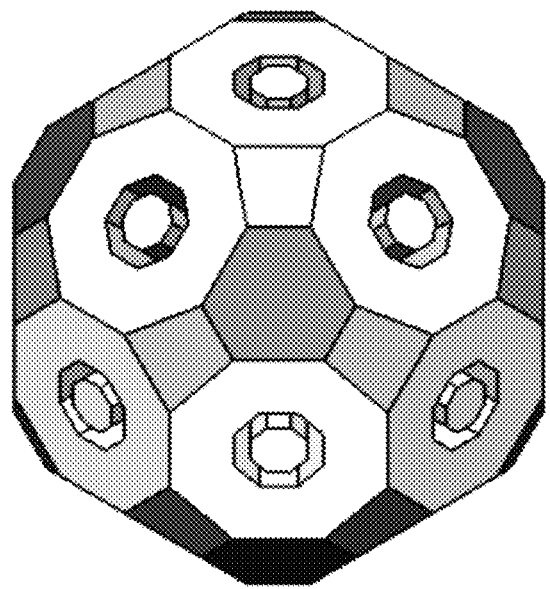
Figure 8-D

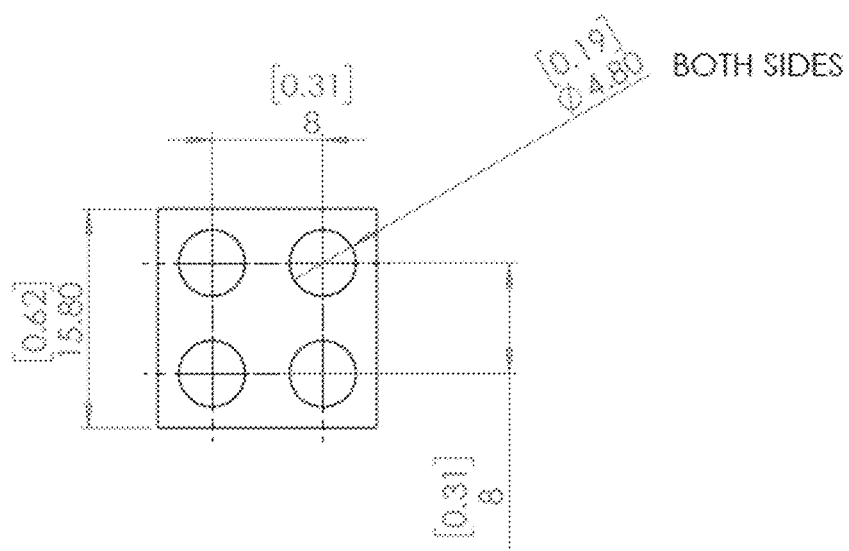
Figure 10-A
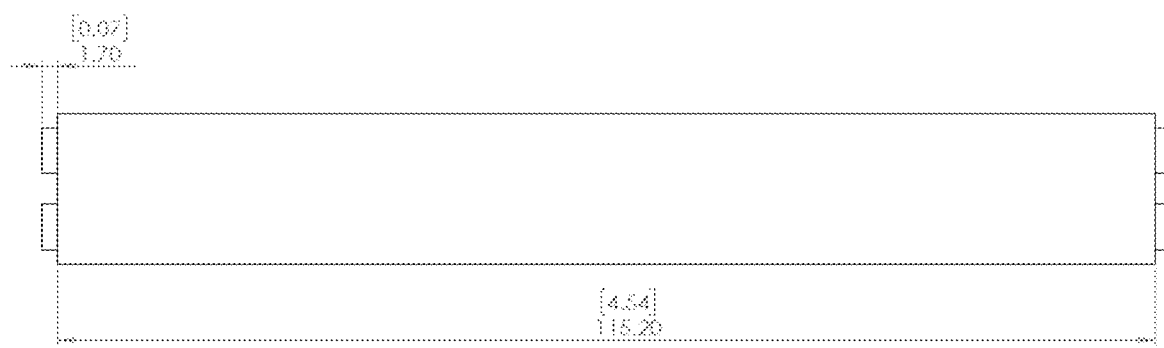
Figure 10-B

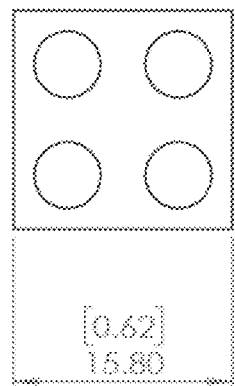
Figure 10-C
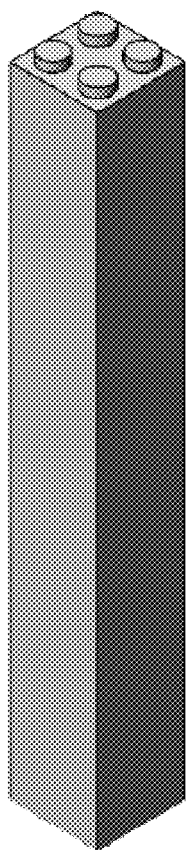
Figure 10-D

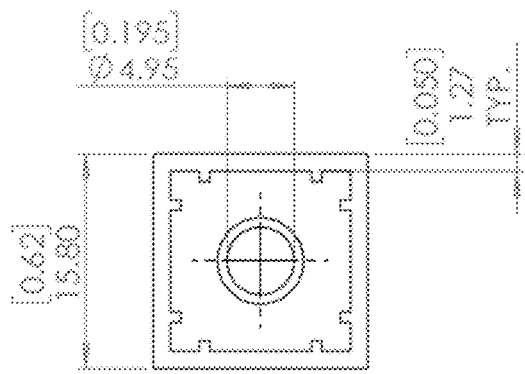
Figure 11-A
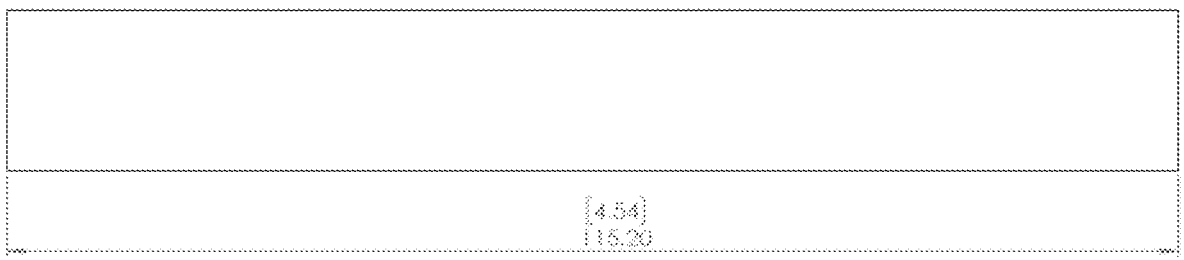
Figure 11-B

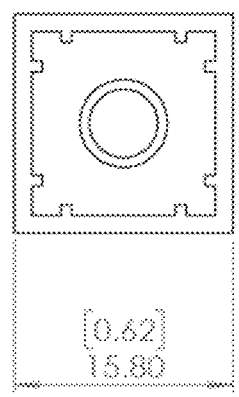
Figure 11-C
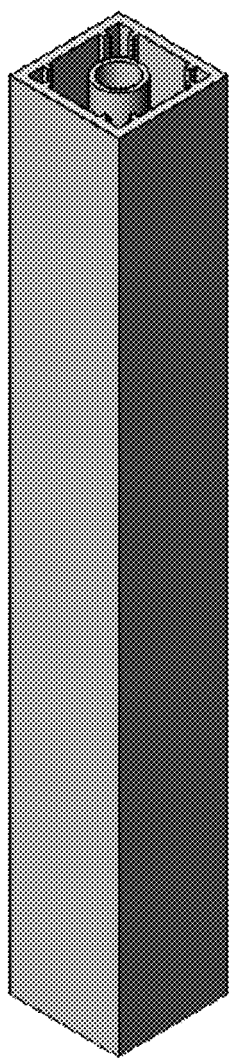
Figure 11-D

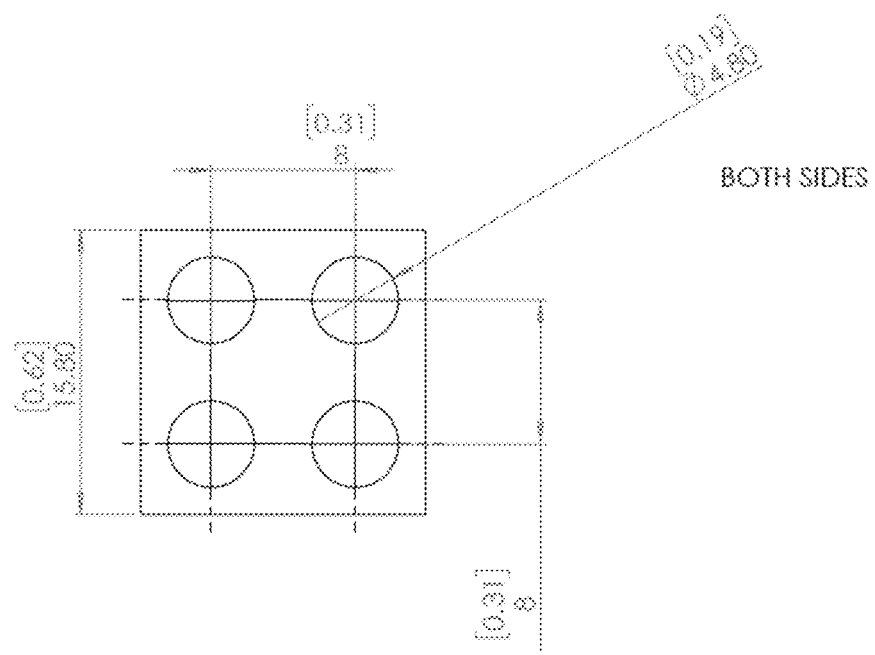
Figure 12-A
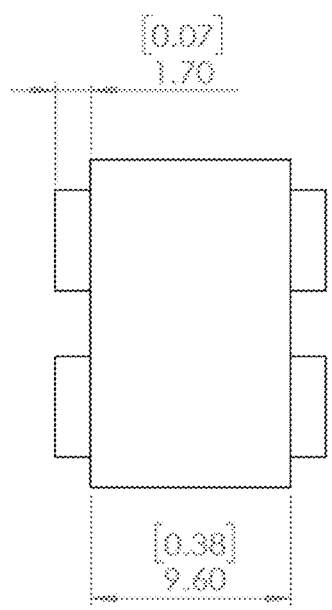
Figure 12-B

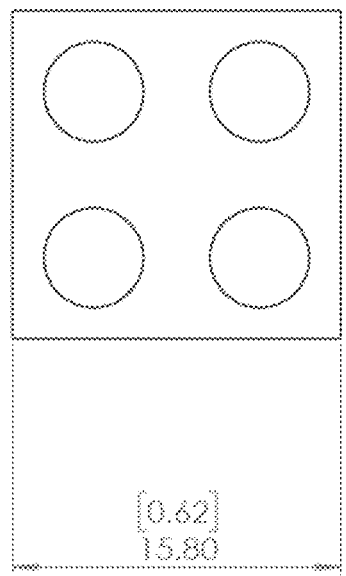
Figure 12-C
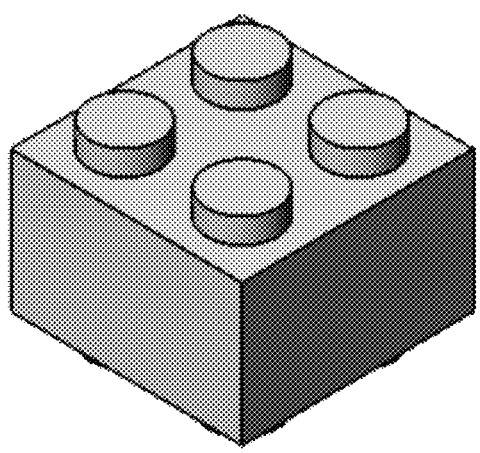
Figure 12-D

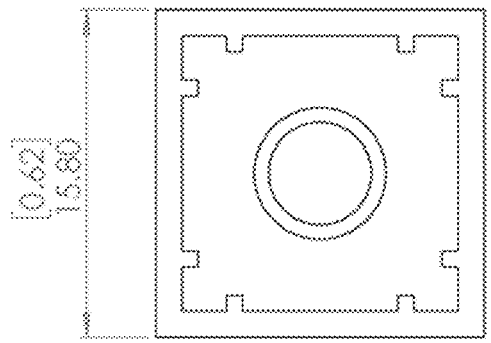
Figure 13-A
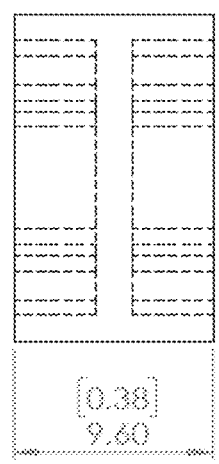
Figure 13-B

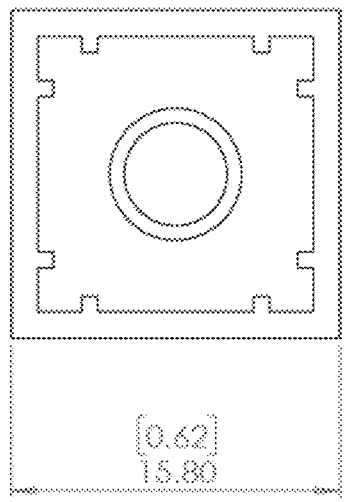
Figure 13-C
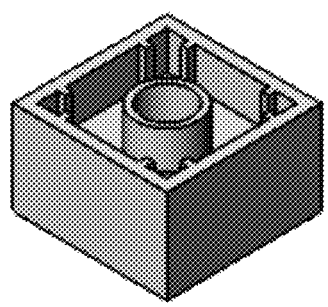
Figure 13-D

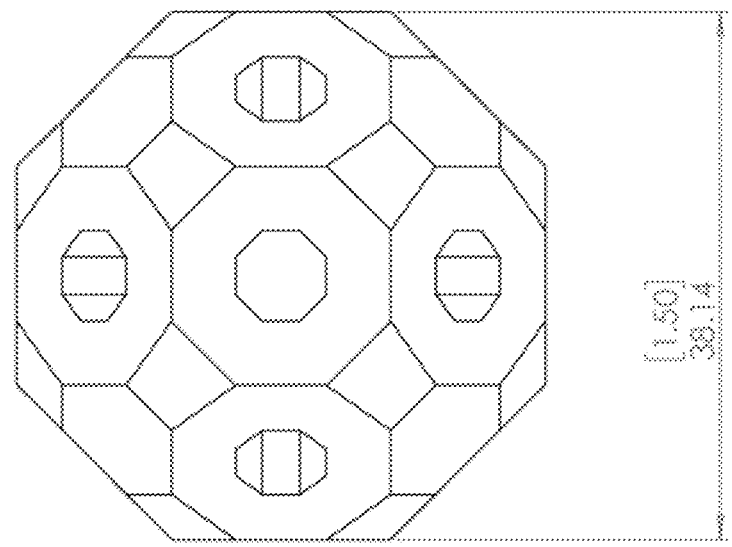
Figure 14-A
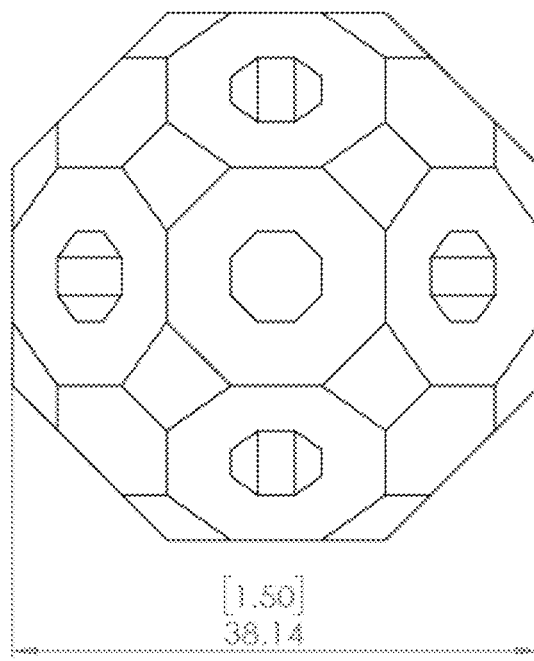
Figure 14-B

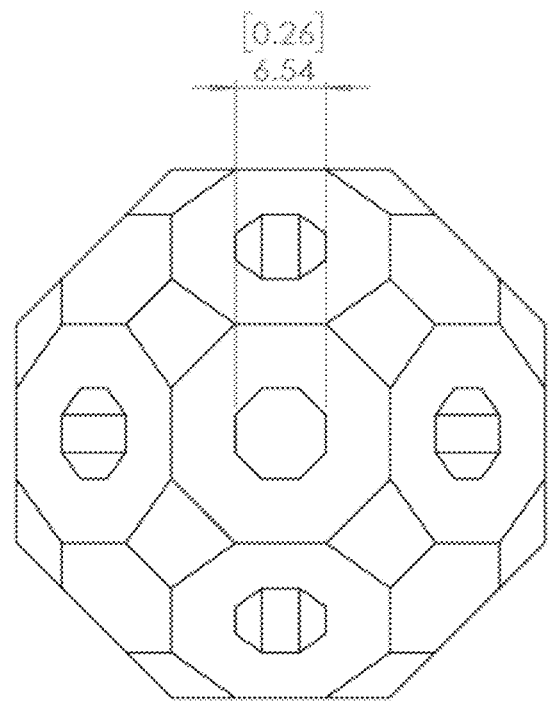
Figure 14-C
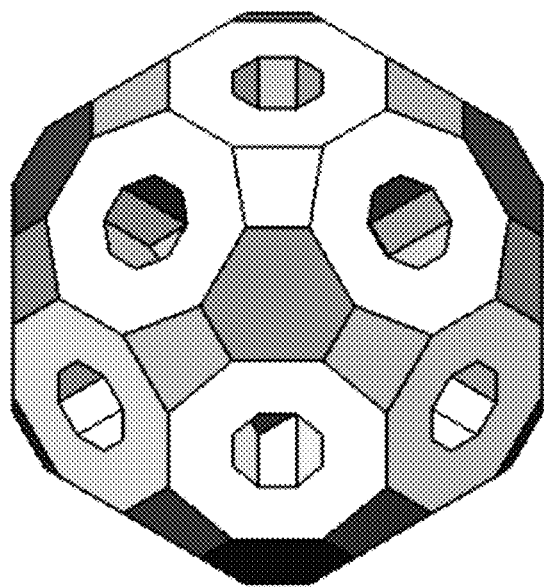
Figure 14-D

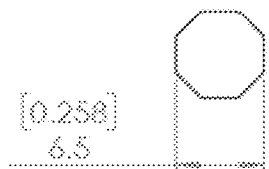
Figure 15-A
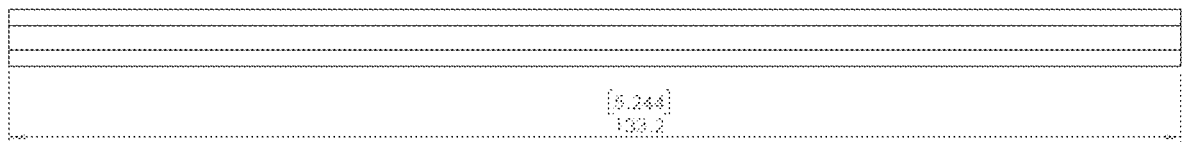
Figure 15-B

Figure 15-C

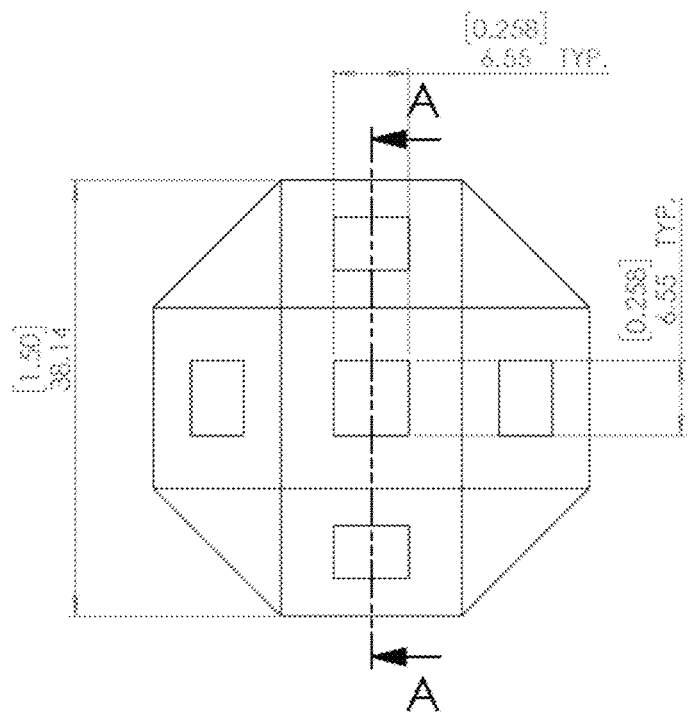
Figure 16-A
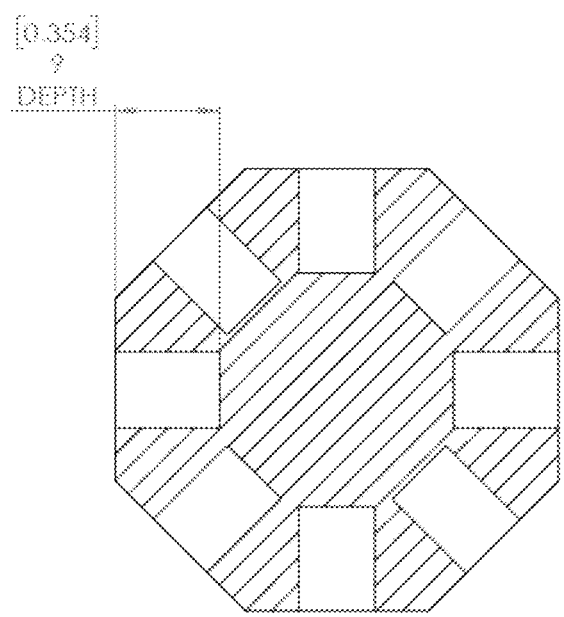
SECTION A-A
Figure 16-B

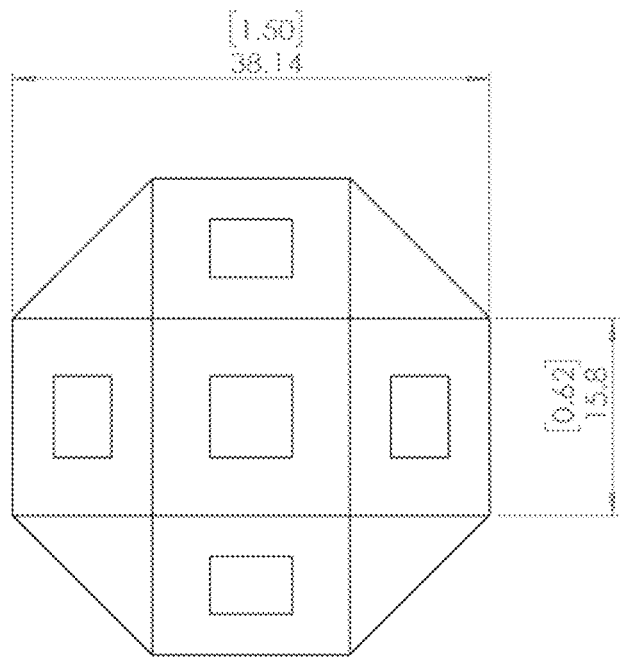
Figure 16-C
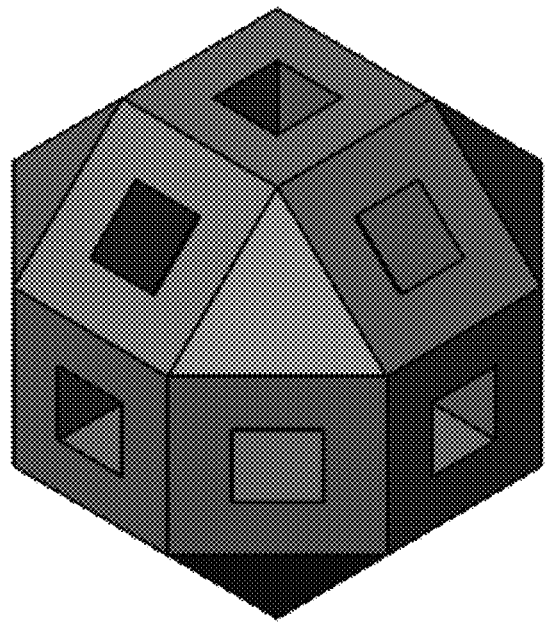
Figure 16-D

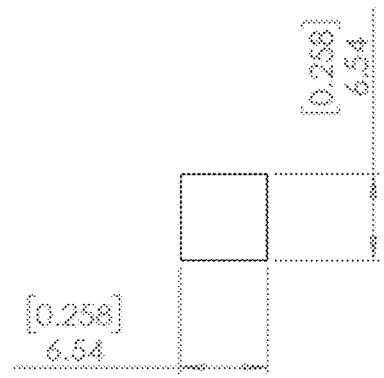
Figure 17-A
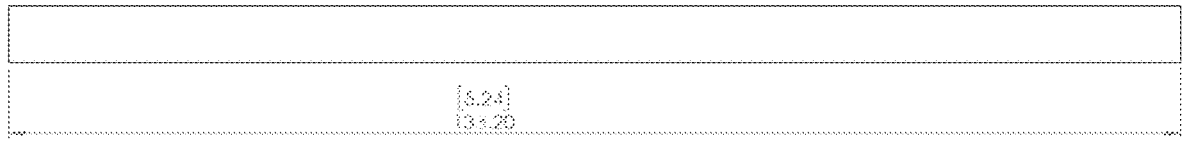
Figure 17-B

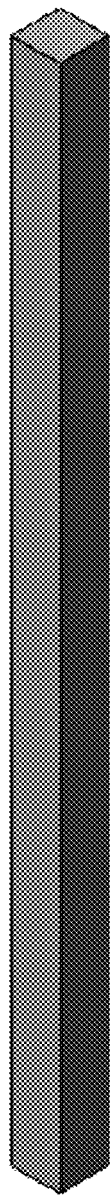
Figure 17-C

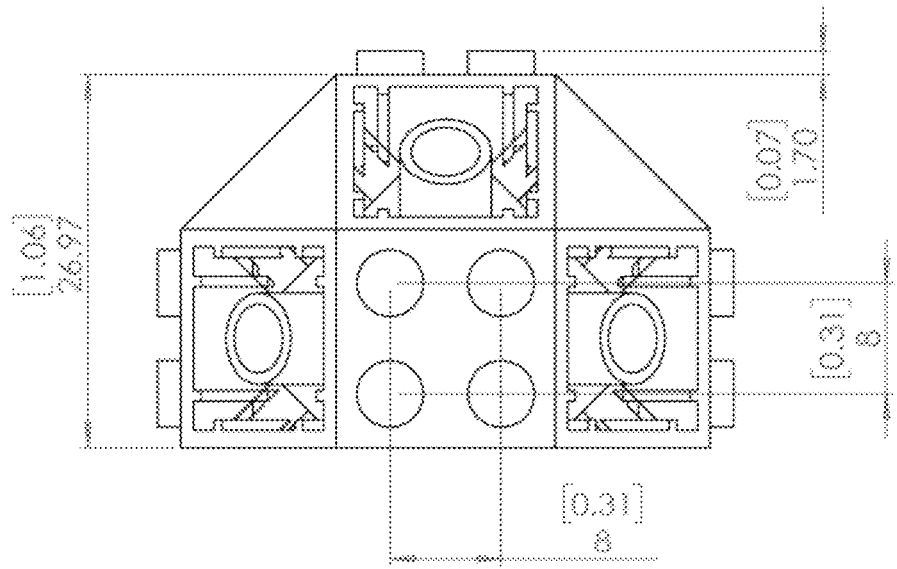
Figure 18-A
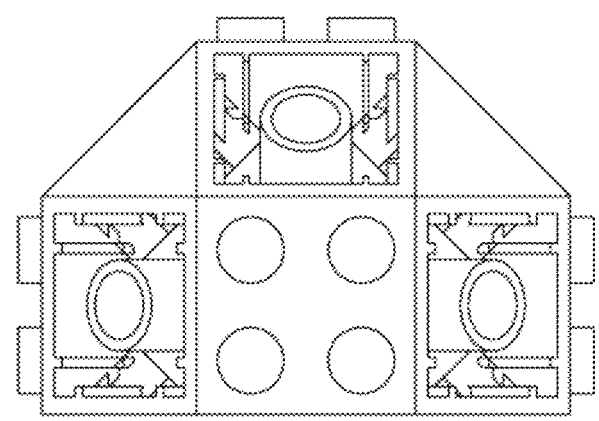
Figure 18-B

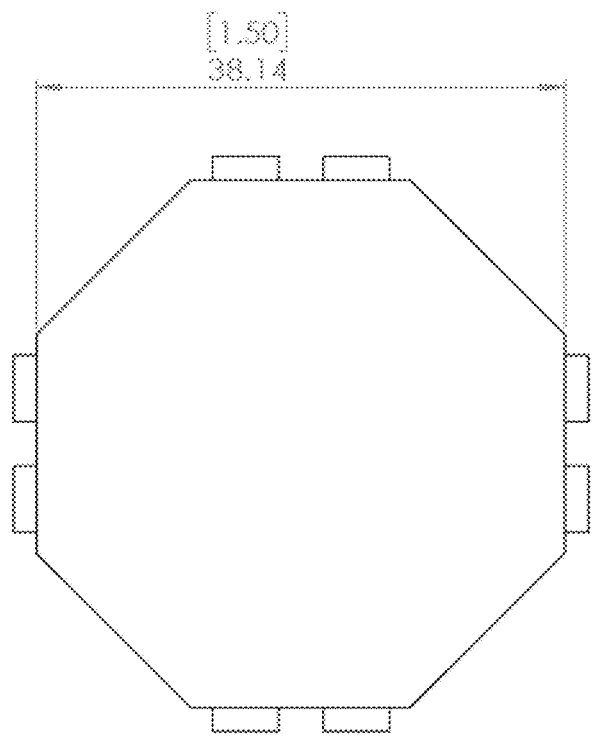
Figure 18-C
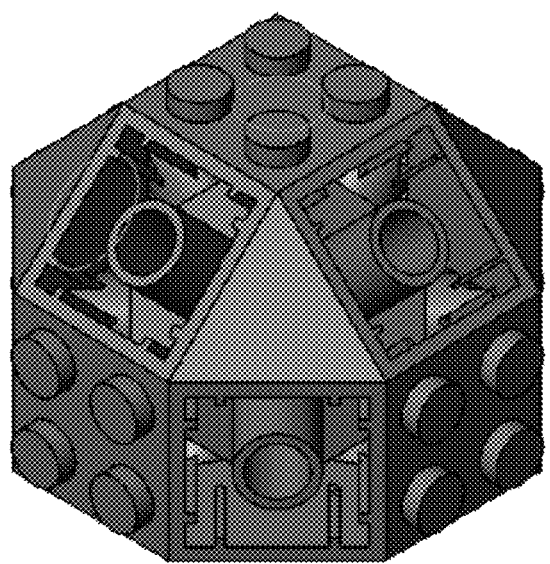
Figure 18-D

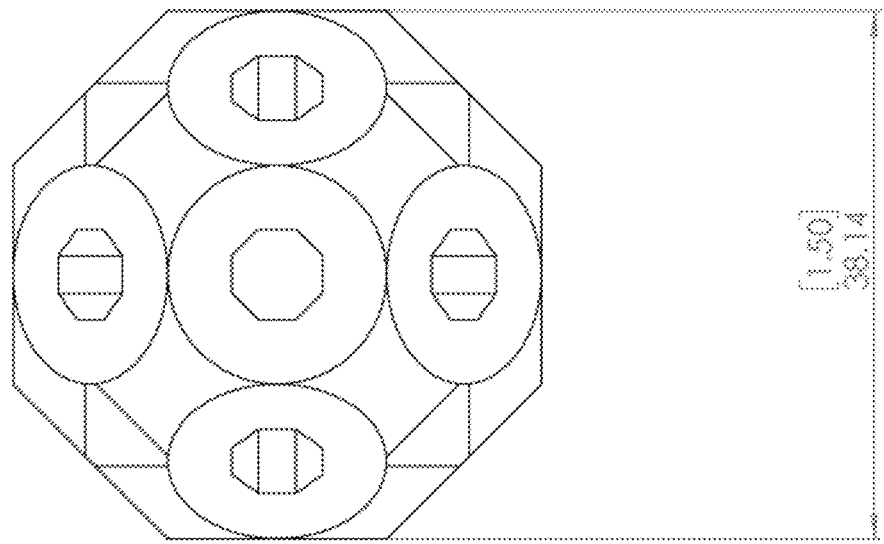
Figure 19-A
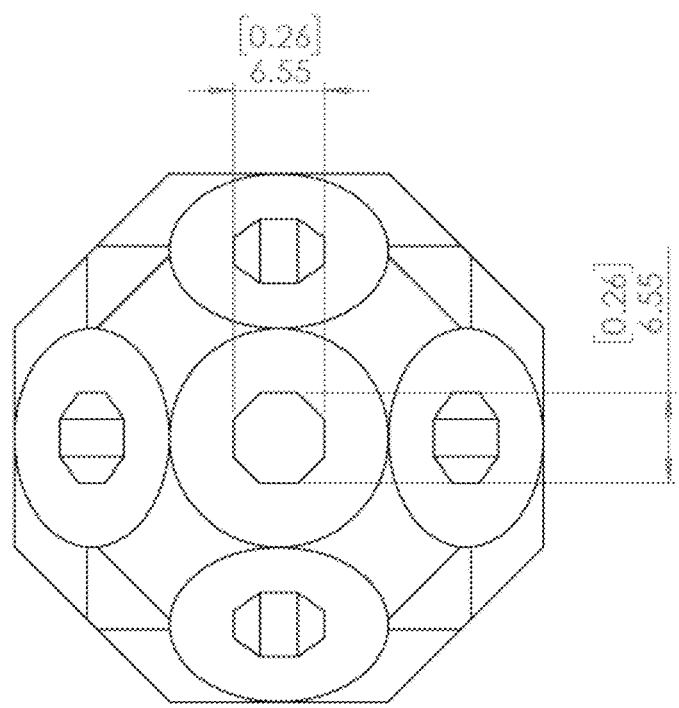
Figure 19-B

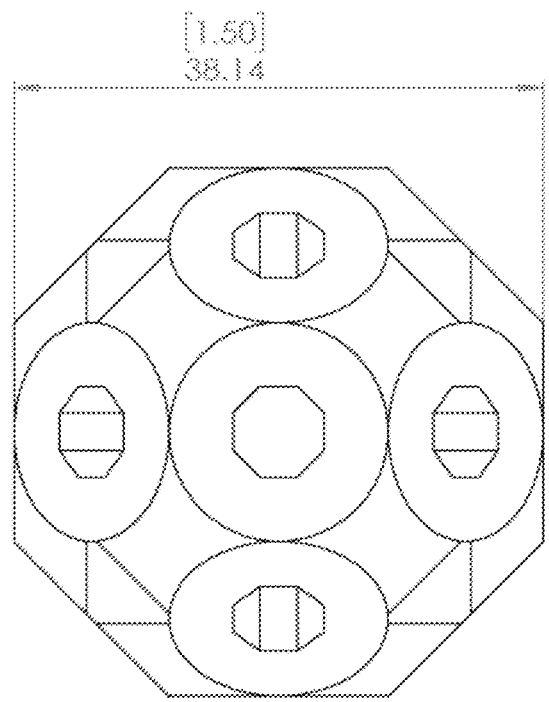
Figure 19-C
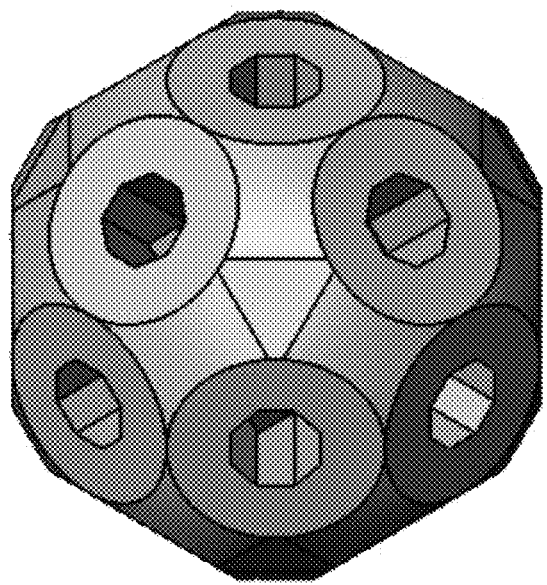
Figure 19-D

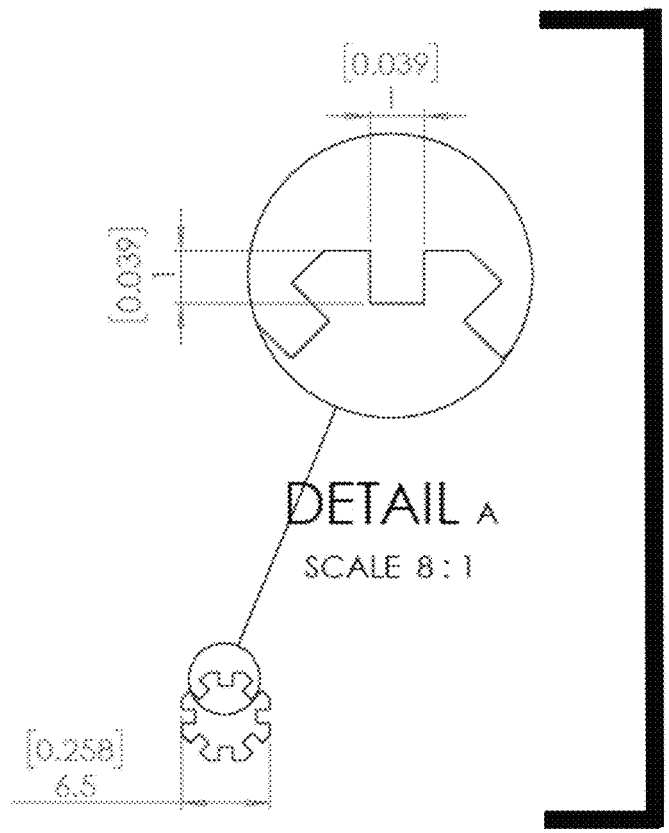
Figure 20-A
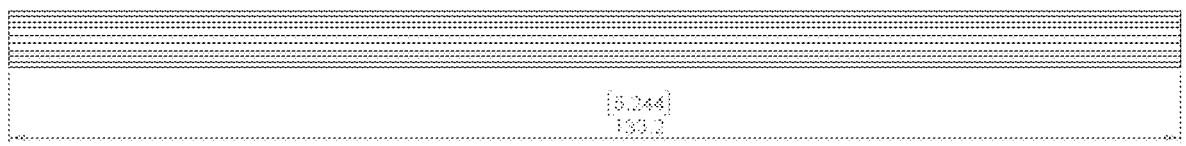
Figure 20-B

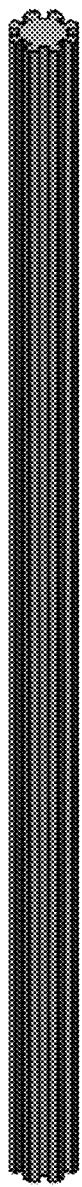
Figure 20-C

STRUCTURAL BASIC UNITS AND THEIR CONNECTIVITY DEVICES

BACKGROUND OF THE INVENTION

The Lego system and other structural games are very popular around the world, for millions of kids, which help them improve their math and design skills. However, the Lego system and other structural games have limited connectivity device and directional devices, so that a lot of the design structures cannot be built from their bricks and pieces or basic blocks or units or basis, using their connectors or connection devices.

So, there is a need for such an improvement, which expands the universe of the Lego system and other structural games drastically, with more degrees of freedom, features, and parameters for expansions, details, structures, shapes, facets, surfaces, sides, extensions, and connectivities, as well as more variations of the final products and more strength for the final structures, with less potential cost for the final products, and more flexibility and reusability for the pieces or basis or connections used to construct the structures based on some original designs or drawings, making the final products more diverse and less expensive to make per device or structure, making the higher ROI (return-on-investment) for producing these models or structures. We will address these here.

However, the invention and embodiments described here, below, have not been addressed or presented, in any prior art, e.g., Zoomtool Inc., which cannot achieve the properties and advantages of our method and system and device.

SUMMARY OF THE INVENTION

In one embodiment, we describe a method and system for structural basic units and their connectivity devices. These can be used for games for kids or for instructional purposes for math and chemistry or physics modeling.

In another application, it can be used for the real-life situations, e.g., to build strong usable structures for storage, housing, and bridges, using the fundamental bricks and modules or connectors taught here, e.g., in a large size or scale, e.g., 10-meter house or structure, using 5 inch or 12 inch or 2 ft, pieces or blocks or bricks, similar to those used in a Lego system, but using our designs and inventions for bricks and connectors.

In another application, we can put glue or cement or concrete or mortar or construction material or other adhesive, as solid or liquid or tape or fluid, between the "bricks" or fundamental units or pieces, for better adhesion, as they dry up, in normal temperature or by heating the "blocks" or bricks or have a cover over them to keep the generated heat inside, for faster recovery and solidification of the mortar or glue.

In another embodiment, we can put some solid or elastic rod through the blocks for better stability, or through the cavities or gaps in between or through them. The rubber or elastic rod or cylinder may be used for areas with flexibility requirements, e.g., on the hollow or wooden deck near seaside or beach, with waves and floating on water, or when the area has lots of earthquakes, which will break/snap in half for the solid rod, which can be fixed/overcome using a rubber or elastic rod or shaft or pipe or lever or connector or intermediate object or inside block object or pole or bar or stick or interconnector or the like.

In another embodiment, we can put some screws and/or bolts between different block to attach them better, or at where the male and female parts meet, or have a belt or band or string or lace or chain, with a buckle or hook or ring for better attachment, where one side of the string or chain is attached or anchored to the block, from factory, or can be attached by the user at home. In another embodiment, the lock and tongue can be snapped together and locked together. In another embodiment, the female and male parts can be snapped together and locked together. In another embodiment, the hole or slit or gap or slide or line or zipper or niche and tongue or perturbation or bump or hill or extension can be snapped together and locked together.

The different embodiments here in this disclosure can be combined together, as well, as a new embodiment, as it has been taught here.

BRIEF DESCRIPTION OF THE DRAWINGS

FIG. 1 *a-d*: is for one embodiment of the invention, as an example, for model 1.

FIG. 2 *a-d*: is for one embodiment of the invention, as an example, for model 2, part male.

FIG. 3 *a-d*: is for one embodiment of the invention, as an example, for model 3, part female.

FIG. 4 *a-d*: is for one embodiment of the invention, as an example, for model 4, part male.

FIG. 5 *a-d*: is for one embodiment of the invention, as an example, for model 5, part female.

FIG. 6 *a-d*: is for one embodiment of the invention, as an example, for model 6, rod.

FIG. 7 *a-c*: is for one embodiment of the invention, as an example, for model 7, Oct. hollow rod.

FIG. 8 *a-d*: is for one embodiment of the invention, as an example, for model 8, truncated rhombicuboctahedron.

FIG. 10 *a-d*: is for one embodiment of the invention, as an example, for model 10, rod male type.

FIG. 11 *a-d*: is for one embodiment of the invention, as an example, for model 11, rod female type.

FIG. 12 *a-d*: is for one embodiment of the invention, as an example, for model 12, standard male type.

FIG. 13 *a-d*: is for one embodiment of the invention, as an example, for model 13, standard female type.

FIG. 14 *a-d*: is for one embodiment of the invention, as an example, for model 14, truncated rhombicuboctahedron, No pin.

FIG. 15 *a-c*: is for one embodiment of the invention, as an example, for model 15, Oct. solid rod.

FIG. 16 *a-d*: is for one embodiment of the invention, as an example, for model 16, Lego compatible type model square cut.

FIG. 17 *a-c*: is for one embodiment of the invention, as an example, for model 17, square solid rod.

FIG. 18 *a-d*: is for one embodiment of the invention, as an example, for model 18, parts 2-3 Alt.

FIG. 19 *a-d*: is for one embodiment of the invention, as an example, for model 19, custom circle Rhomb.

FIG. 20 *a-c*: is for one embodiment of the invention, as an example, for model 20, Oct. solid rod with cut.

DETAILED DESCRIPTION OF THE PREFERRED EMBODIMENTS

Figure 9:
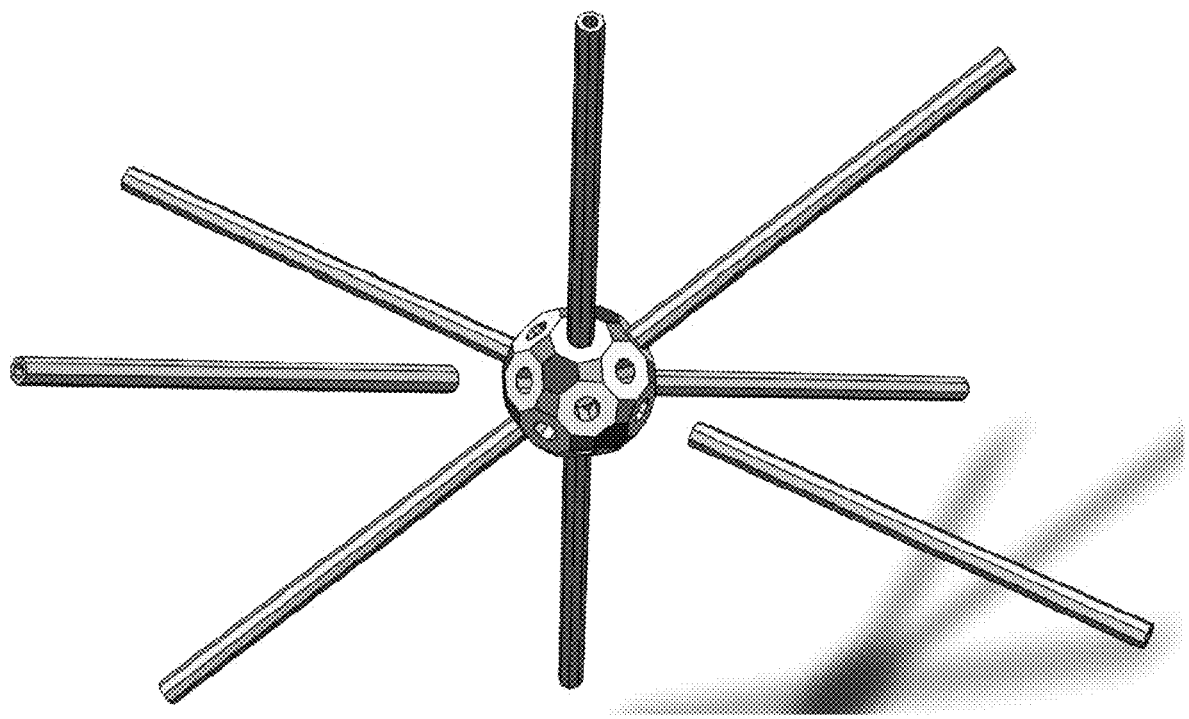
FIG. 9: is for one embodiment of the invention, as an example, for model 9, assembly.

In one embodiment of the invention, as an example, we have a universal joint or connection or attachment or hand or leg or rod or connector for bricks or small units or basis or blocks or blocs or fundamental parts or components or organs or lattices or basics or pieces or basic bricks or basic units or basis or small pieces. The following are some examples or embodiments or applications or usages, but not limiting the scope of the invention by any amount.

This improves Lego and other structural games or instructional packages, e.g., for chemistry or physics classes or modeling. This can be applied in software form as well, for similar improvement in software modeling and structure on computer screens or displays or monitors, similar to the real tangible structures we offer here in this invention.

This improves the brick structures and joints and rods, with less chance of collapse, and longer lifetime. This gives more choices and degrees of freedom for the length and angles and relative positioning and absolute positioning and positioning and locations and final resultant and minor adjustment and major adjustment and density and 3-D coordinates for connectors or arms and nodes or bricks or basics or blocks, with respect to each other and with respect to the whole model or final model or structure, resulting from all connections and lattices.

This is a big enabler, which makes any structure possible, with any angle or direction or position or coordinate, for both absolute or relative positioning and directions. So, it is extremely valuable for all games, instruction/course industry, and real or big structures for housing or bridges or civil engineering or structural engineering or houses or storages or stores or temporary or permanent units or the like.

So, it is very economical and useful for many reasons given here. Thus, overall cost for manufacturing and construction goes down. In addition, storing or transportation cost of the blocks are cheaper, due to flexibility and re-usability of the blocks. So, the inventory requirements are lower, further reducing the cost, and encouraging further acceptance by consumer and public, and thus, increasing users' base, thus, economy of scale, further reducing the production cost for end users, which are all positive for the industry and users or consumers, for all industries mentioned above.

This can be used for earth quake or shock absorber or on the water structures or floating on water that need flexibility and movability parameters in all directions. Thus, we can produce better and cheaper and faster structures for those applications. These can also use flexible or elastic blocks or rods, or both, or some flexible or elastic glues or mortar or bands or bonds in between the blocks, or inside them or around them or used as cage or shell around them, or at joints or at arms between nodes, or the like.

The rods can be circular, and the plates can also be circular cross sections for the holes, for connections, for the nodes. The plates can be rectangular or square or triangular or polygonal for the cross sections for the holes. The rods can be the same shapes, as well in the cross section. They can have grooves on them. They can be solid. They can be hollow, in another embodiment. They can be rectangular female and male (e.g., compatible with Lego). They can be no grooves on surfaces female and male (e.g., not compatible with Lego). They can be 8-sided (e.g., compatible with Lego). They can be circular with 8 sides or 4 sides, or truncated (cut in middle, for more sides).

For all components described in this patent: The materials can be plastic, glass, crystal, stone, fabricated stone, fabricated wood, wood pieces, elastic, wood, fabric, compressed wood particle, metal, alloy, clay, cement, concrete, glue, fabric, cotton, wool, natural, petrochemical, artificial material, or combination, or the like. The size can be large or small, e.g., from 0.5 cm to 50 meters, or more. The connection angle can be 135, 90, 30, 60, 45 degrees, or the like, for connection to the arms or cells or units or nodes or rods.

The sides and/or the faces or surfaces or planes or plates can have an angle of 135, 90, 30, 60, 45 degrees, or the like, with respect to each other, or with respect to the neighbors, or with respect to horizontal or vertical surfaces or planes or lines, or with respect to an absolute or relative direction or plane or ground or base or surface, or with respect to the direction of arms or one of the arms, which may have different directions, originated on the same or different surfaces or faces.

The structure can be based on Rhombicuboctahedron shape, in one example, for unit or node or basis, in one example. It can have 18 squares and 8 triangles, for 26 sides total, in one example.

It can be a shock absorbent structure under a building, e.g., for earth quake areas, in one example. It can connect the node or basis directly to the building, or through an arm, rod, or connector, or blocks, or another structure, as an intermediate. It can be as one piece or multiple pieces.

The basis or block can be cut with a knife or saw, and the remaining will be flat on one face or side, as the cut side, and the resultant will be a new basis or block. It can have female-male connections or other connectors as taught here.

It can make a statue or sculpture or model, big or small size, as an example. It can have different shapes, e.g., with 16 sides, or 32 or 64 or 128 or the like. It can have conventional joints or connectors similar to Lego's joints or connectors, or any other connectors described in this invention. The rods can be triangular or rectangular or square or pentagon shape or the like, in cross section. The rods can make triangular or rectangular or square or pentagon shape or the like, as structure or shape or model themselves, as final form.

In one example, the rod has a shaft and 2 extended endings that are pushed in to the hole for the node, to attach to the node, for the lattice structure. In one example, the extended endings that are pushed in to the hole for the node, and then rotated with some angle inside the hole, to click, to attach to the node. In one example, the rod and its endings are in one piece. In one example, the rod and its endings are separate pieces. The joints or connectors can be attached or as separate pieces. It can have multiple types of joints or same type of joints. The joints and cells or nodes can have any type of shapes, e.g., with 20 sides or 12 sides, or the like.

FIG. 1 is for one embodiment of the invention, as an example, for model 1. It shows how the cell or node looks like and how it gets connected to other cells or nodes or arms or connectors or joints, from various sides and angles, using holes and extensions to lock them together, as e.g., female and male parts shown in the figure. FIG. 2 is for one embodiment of the invention, as an example, for model 2, part male, for a cell or node, but it can be any other geometrical shapes, and it can have more/less number of holes or extensions per each side of the object, as e.g., female and male parts shown in the figures. FIG. 3 is for one embodiment of the invention, as an example, for model 3, part female, similar to FIG. 2 above. FIG. 4 is for one embodiment of the invention, as an example, for model 4, part male, which looks like a symmetric cell or unit which was cut by a horizontal blade, to have a flat bottom, or flat bottom with connectors, such as female and male parts, for connectivity to others.

FIG. 5 is for one embodiment of the invention, as an example, for model 5, part female, similar to FIG. 4. FIG. 6 is for one embodiment of the invention, as an example, for model 6, rod, with its cross section or connectivity means or engagement section or device. FIG. 7 is for one embodiment of the invention, as an example, for model 7, Oct. hollow rod, as another variation of rod, which can be other geometrical cross sections as well, similar to FIG. 6. FIG. 8 is for one embodiment of the invention, as an example, for model 8, truncated rhombicuboctahedron, with holes and connectors or means for connections to other cells or rods or structures, with the same cross sections to get matched, fitted, locked, and connected, but with more flexibility of other rods, units, cells, or structures, at different angles and directions or faces or parameters, which is not possible with prior art.

FIG. 9 is for one embodiment of the invention, as an example, for model 9, assembly, e.g., fitted to FIG. 8, with rods connected to the cells or nodes, with correct fitting cross sections to lock them up together for connections and strength of structure with a good fit for the holes and rods' endings' cross sections, which can be of any shape, as long as they match each other. FIG. 10 is for one embodiment of the invention, as an example, for model 10, rod male type, as a variation of rods for connectivity to the other parts or components, as discussed above. FIG. 11 is for one embodiment of the invention, as an example, for model 11, rod female type, similar to FIG. 10.

FIG. 12 is for one embodiment of the invention, as an example, for model 12, standard male type, as a block or node or cell, or alternatively, as an extreme short rod for connectivity. FIG. 13 is for one embodiment of the invention, as an example, for model 13, standard female type, similar to FIG. 12. FIG. 14 is for one embodiment of the invention, as an example, for model 14, truncated rhombicuboctahedron, No pin, with holes, for connectivity, as the variations of the above.

FIG. 15 is for one embodiment of the invention, as an example, for model 15, Oct. solid rod, as the variations of the above, for connectivity. FIG. 16 is for one embodiment of the invention, as an example, for model 16, Lego compatible type model square cut, with holes and connectivity to others. FIG. 17 is for one embodiment of the invention, as an example, for model 17, square solid rod, as a variation of the above.

Figure 21:
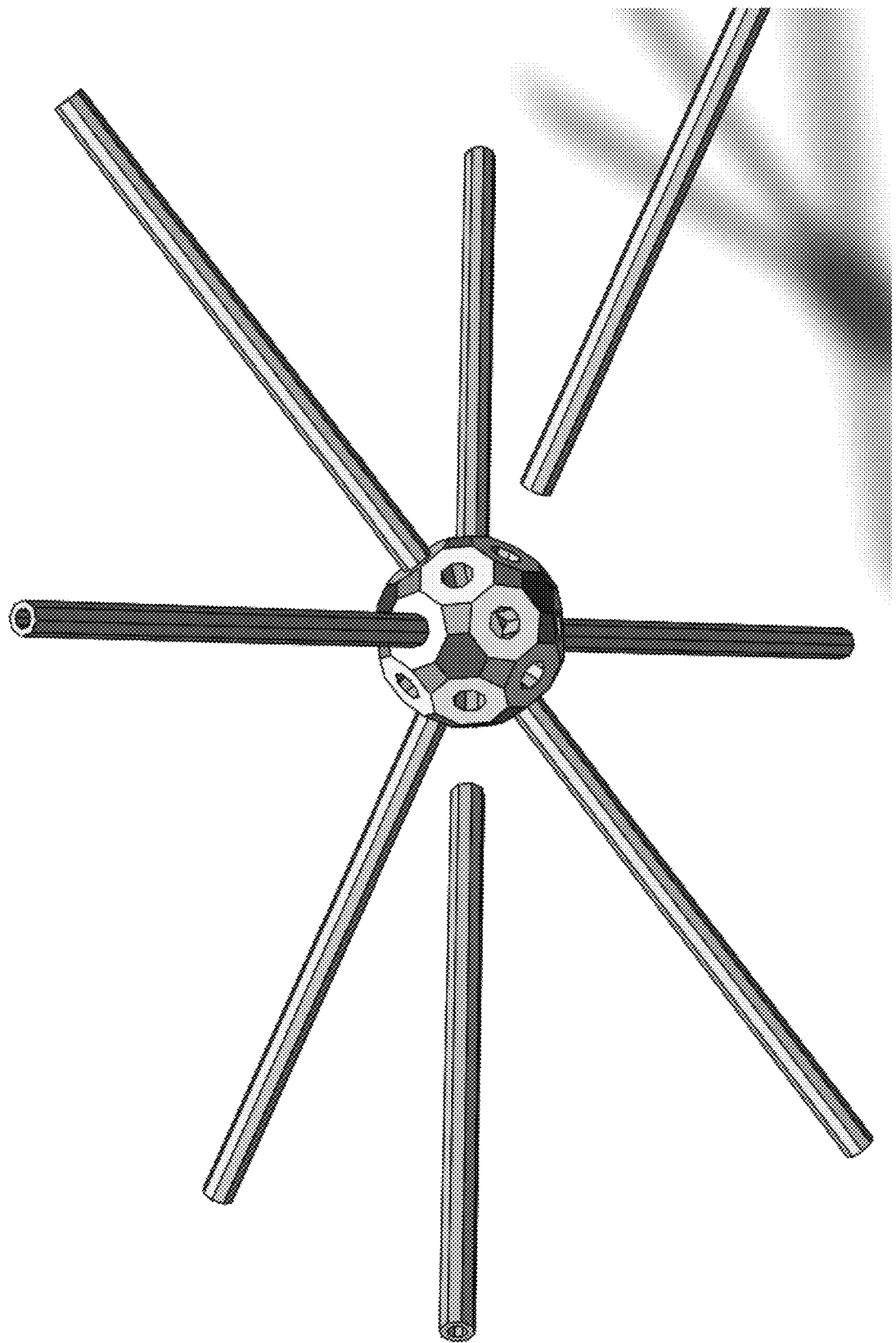
FIG. 21 is for one embodiment of the invention, as an example, for model 21, Assembly 1.

FIG. 18 is for one embodiment of the invention, as an example, for model 18, parts 2-3 Alt, e.g., similar to one of the above units or cells with a horizontal cut, flat bottom, as a variation of the above, with some methods or examples for connectivity shown. FIG. 19 is for one embodiment of the invention, as an example, for model 19, custom circle Rhomb, with different cross section of polygons, as a variation for connectivity, similar to the above. FIG. 20 is for one embodiment of the invention, as an example, for model 20, Oct. solid rod with cut, with rod shape and edge cross section enlarged and shown, for a variation of the above, for locking mechanism to other parts or components or units or cells or assemblies or structures. FIG. 21 is for one embodiment of the invention, as an example, for model 21, Assembly 1, as an example of rods and a unit or cell connected or locked, from various angles and directions.

Figure 22:
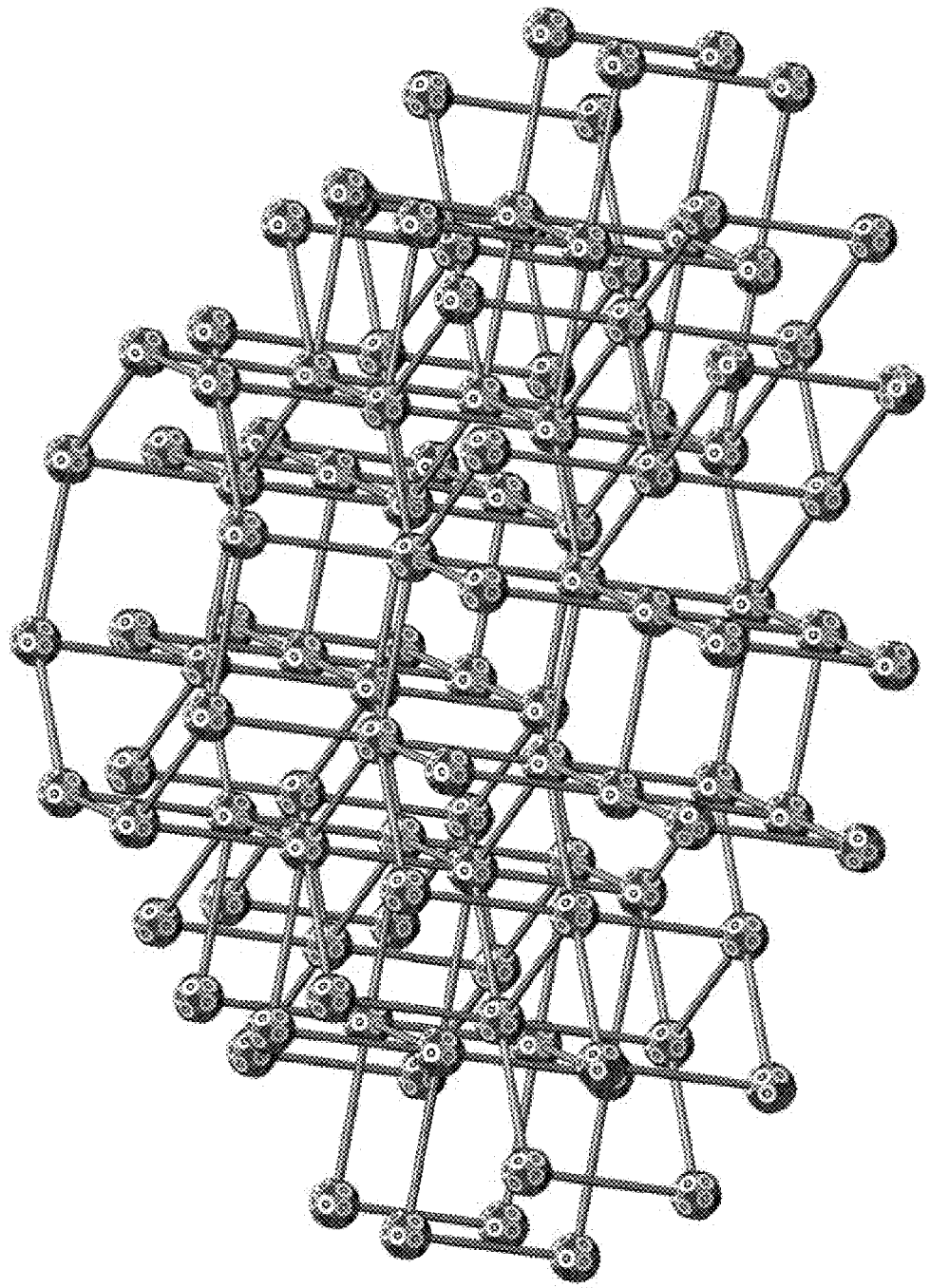
FIG. 22 is for one embodiment of the invention, as an example, for model 22, Assembly 2.
Figure 23:
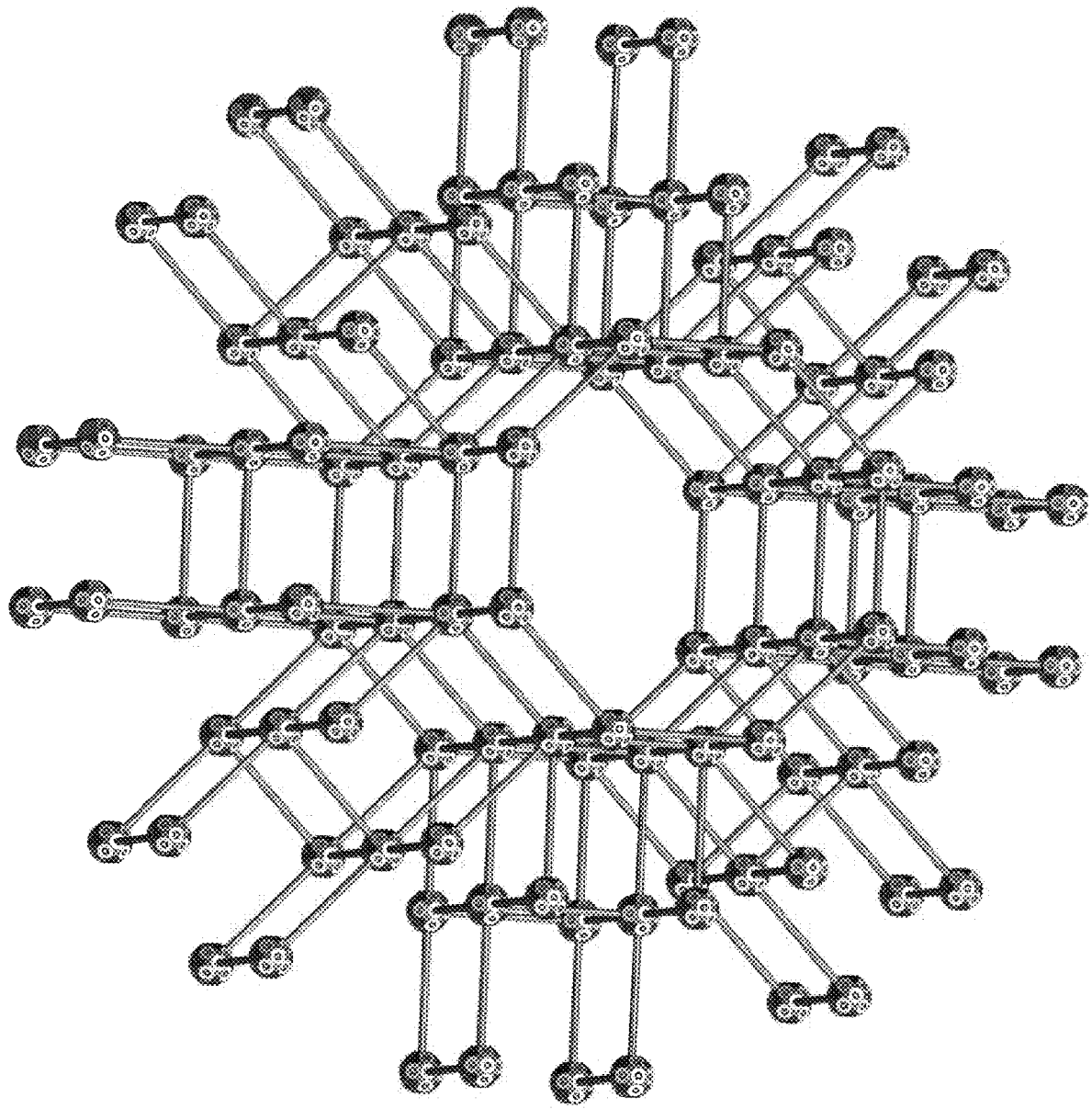
FIG. 23 is for one embodiment of the invention, as an example, for model 23, Assembly 3.
Figure 24:
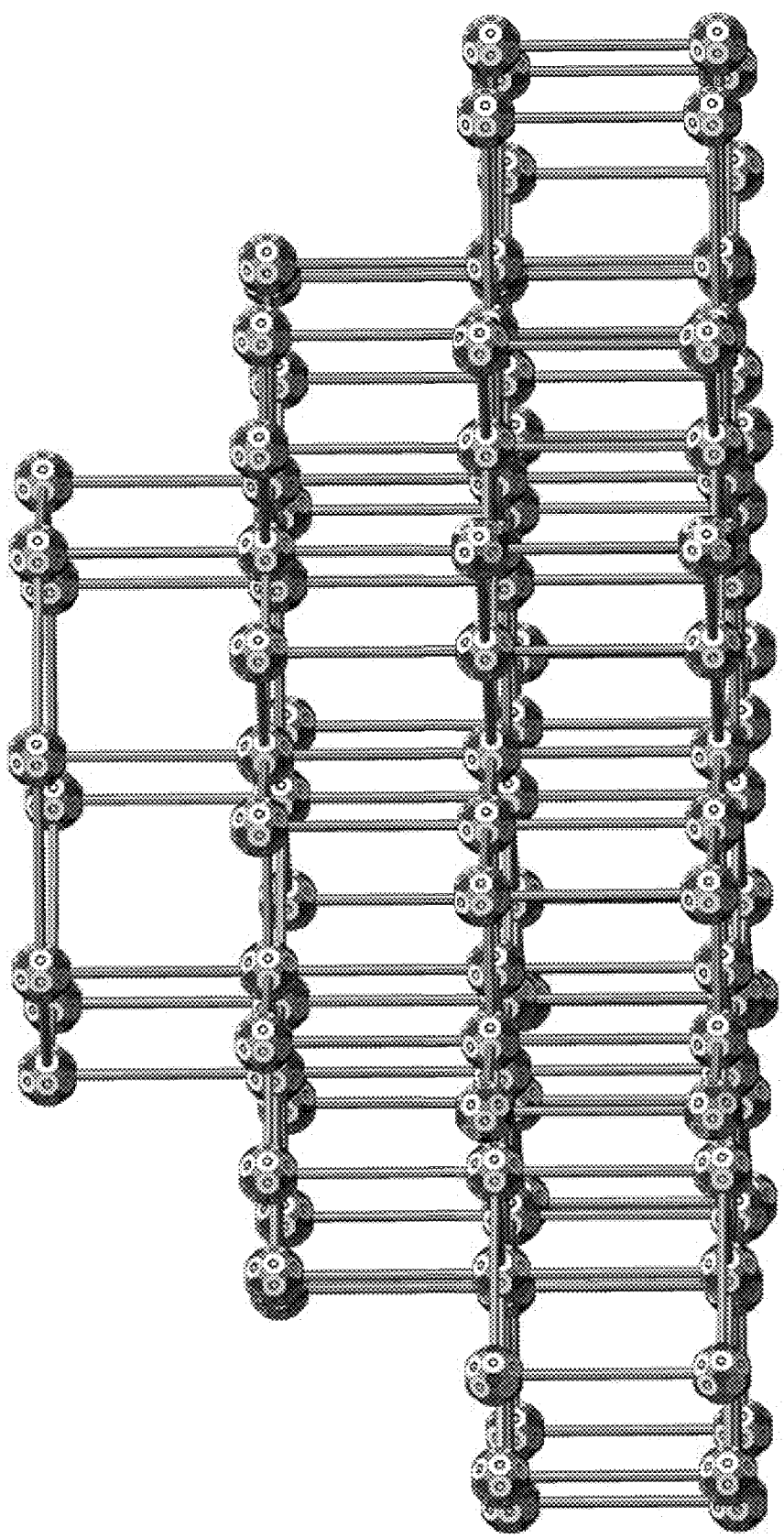
FIG. 24 is for one embodiment of the invention, as an example, for model 24, Assembly 4.
Figure 25:
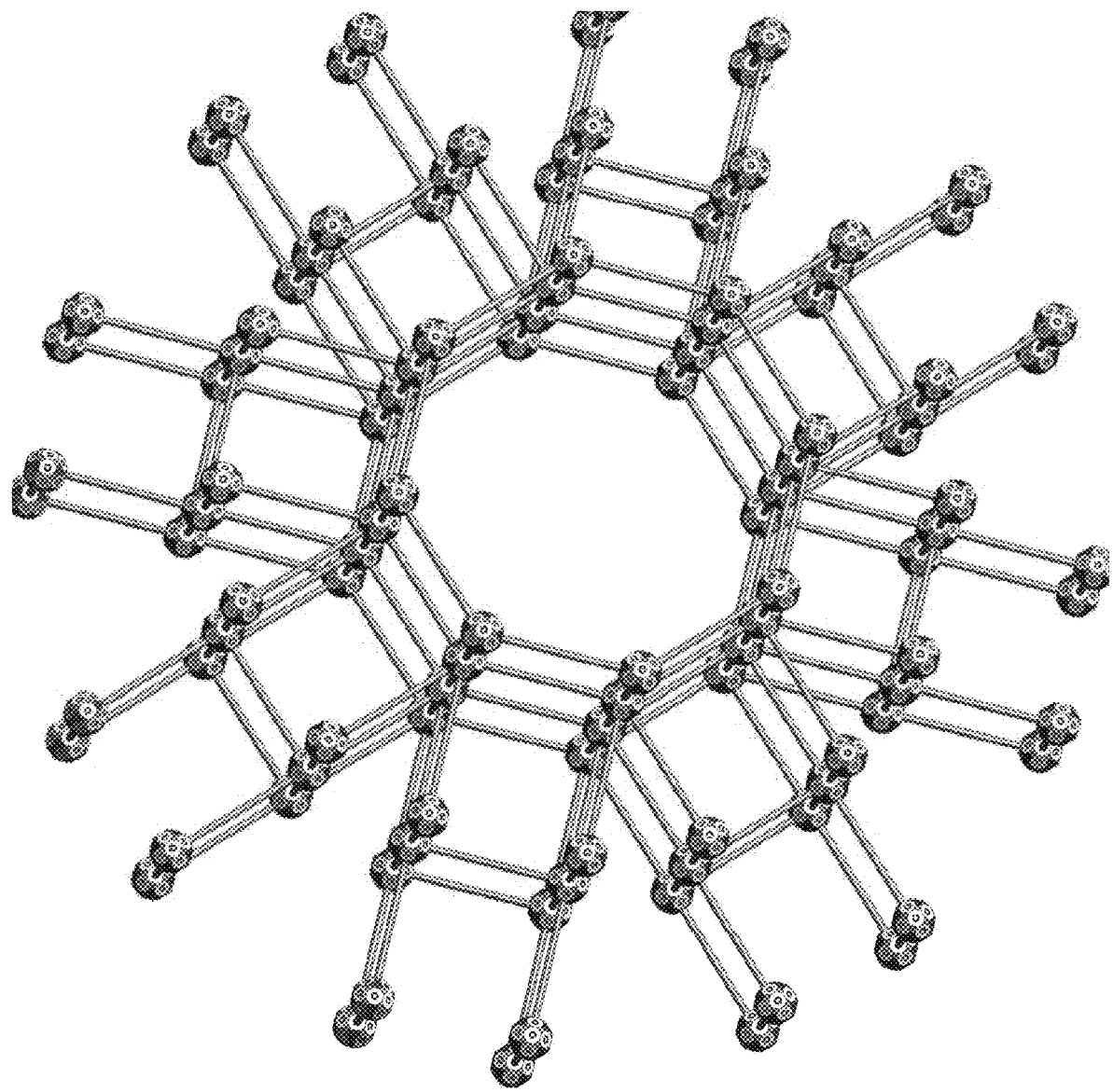
FIG. 25 is for one embodiment of the invention, as an example, for model 25, Assembly 5.

FIG. 22 is for one embodiment of the invention, as an example, for model 22, Assembly 2, with big pattern or structure of repeated units or cells with arms or rods, for a much bigger structure or building for toys or teaching tool or structural engineers. FIG. 23 is for one embodiment of the invention, as an example, for model 23, Assembly 3, similar to FIG. 22, as a variation of that. FIG. 24 is for one embodiment of the invention, as an example, for model 24, Assembly 4, similar to FIG. 22, as a variation of that, with different overall geometry, which generally can have different holes or number of holes or directional holes or various angles or rod directions or hole facing directions or cuts on faces or density of holes or bars, per face of the unit or cell, as a variation of the FIG. 24. FIG. 25 is for one embodiment of the invention, as an example, for model 25, Assembly 5, similar to FIG. 22, as a variation of that, with different overall geometry.

The Figures contain some typical dimensions, distances, and angles or shapes, as examples, but they are not limiting at all, as the range of values are very wide, and given elsewhere in this patent.

In one example or embodiment, we have: A connector joint device for connecting rods or arms at a joint or intersection, said connector joint device comprising: more than one hexagon shape faces; more than one octagon shape faces; more than one 4-sided polygon shape faces; wherein each some or all of said more than one octagon shape faces has a hole; wherein said hole is located at center of said each some or all of said more than one octagon shape faces; wherein said hole's cross section is octagon shaped; wherein a bar or arm goes in to said hole and gets connected to said connector joint device.

In one example or embodiment, we have:
  wherein a bar or arm goes in to said hole and gets connected to said connector joint device, by some angular rotation inside said hole to get locked in.
  wherein a bar or arm goes in to said hole and gets connected to said connector joint device, by some pressure to get said bar's or arm's head snapped and locked tightly in to said hole.
  wherein said connector joint device is inside a toy.
  wherein said connector joint device is inside an instructional device.
  wherein said connector joint device is inside a structural assembly, house, or housing.
  wherein glue is used or placed inside or around said connector joint device.
  wherein cement or mortar or grout is used or placed inside or around said connector joint device.
  wherein said connector joint device is in a structure floating on water.
  wherein said connector joint device is in an earth quake-resistant structure.
  wherein said hole's shaft's direction is perpendicular to said each some or all of said more than one octagon shape faces.
  wherein said hole's shaft's direction has a 30 degree angle with respect to perpendicular line to said each some or all of said more than one octagon shape faces.
  wherein said hole's shaft's direction has a 45 degree angle with respect to perpendicular line to said each some or all of said more than one octagon shape faces.
  wherein said hole's shaft's direction has a 15 degree angle with respect to perpendicular line to said each some or all of said more than one octagon shape faces.
  wherein said connector joint device has a male part.
  wherein said connector joint device has a flat cut bottom.

wherein said connector joint device has all faces with symmetric shaped sides.

wherein said connector joint device has some faces with asymmetric shaped sides.

wherein said hole has a slit or gap or niche or railing or opening or cut or split, where said bar or arm gets locked in.

wherein said hole has a gap or niche or opening or recess, where said bar's or arm's head snapped and locked tightly in.

In one example, the cell is only a connector or joint device. In one example, the cell itself is a structure or unit for the assembly or final product or building. The bars or arms or legs or connectors can be short and fat for tight structure, or otherwise, long and thin for mostly empty space in between for scattered structure for different applications, or somewhere in between, for various intermediate applications. In one example, we have rods and holes. In one example, we have male/female combination. In one example, we have the combination of all of the above in this disclosure, on each side with a different combination.

Any variations of the above teaching are also intended to be covered by this patent application, and any combination of the above is also considered/included as a part of the teaching.

The invention claimed is:

1. A connector joint device for connecting rods or arms at a joint or intersection, said connector joint device comprising:
   more than one hexagon shape faces;
   more than one octagon shape faces;
   more than one 4-sided polygon shape faces;
   wherein a first face among said more than one octagon shape faces has a hole;
   wherein said hole is located at center of said first face among said more than one octagon shape faces;
   wherein said hole's cross section is octagon shaped;
   wherein said hole's shaft's direction has a 30 degree angle with respect to perpendicular line to said first face among said more than one octagon shape faces;
   wherein a bar or arm is configured to go in to said hole and get connected to said connector joint device.

2. The connector joint device for connecting rods or arms at a joint or intersection as recited in claim 1, wherein said connector joint device is configured to fit inside a toy.

3. The connector joint device for connecting rods or arms at a joint or intersection as recited in claim 1, wherein said connector joint device is configured to fit inside an instructional device.

4. The connector joint device for connecting rods or arms at a joint or intersection as recited in claim 1, wherein said connector joint device is configured to fit inside a structural assembly, house, or housing.

5. The connector joint device for connecting rods or arms at a joint or intersection as recited in claim 1, wherein glue is used or placed inside or around said connector joint device.

6. The connector joint device for connecting rods or arms at a joint or intersection as recited in claim 1, wherein cement or mortar or grout is used or placed inside or around said connector joint device.

7. The connector joint device for connecting rods or arms at a joint or intersection as recited in claim 1, wherein said connector joint device is configured to fit in a structure floating on water.

8. The connector joint device for connecting rods or arms at a joint or intersection as recited in claim 1, wherein said connector joint device is configured to fit in an earth quake-resistant structure.

9. The connector joint device for connecting rods or arms at a joint or intersection as recited in claim 1, wherein said connector joint device has a male part.

10. The connector joint device for connecting rods or arms at a joint or intersection as recited in claim 1, wherein said connector joint device has a flat cut bottom.

11. The connector joint device for connecting rods or arms at a joint or intersection as recited in claim 1, wherein said connector joint device has all faces with symmetric shaped sides.

12. The connector joint device for connecting rods or arms at a joint or intersection as recited in claim 1, wherein said connector joint device has some faces with asymmetric shaped sides.

13. A connector joint device for connecting rods or arms at a joint or intersection, said connector joint device comprising:
   more than one hexagon shape faces;
   more than one octagon shape faces;
   more than one 4-sided polygon shape faces;
   wherein a first face among said more than one octagon shape faces has a hole;
   wherein said hole is located at center of said first face among said more than one octagon shape faces;
   wherein said hole's cross section is octagon shaped;
   wherein said hole's shaft's direction has a 30 degree angle with respect to perpendicular line to said first face among said more than one octagon shape faces;
   wherein a bar or arm is configured to go in to said hole and get connected to said connector joint device, and get locked in.

14. The connector joint device for connecting rods or arms at a joint or intersection as recited in claim 13, wherein said hole has a slit or gap or niche or railing or opening or cut or split, for said bar or arm.

15. A connector joint device for connecting rods or arms at a joint or intersection, said connector joint device comprising:
   more than one hexagon shape faces;
   more than one octagon shape faces;
   more than one 4-sided polygon shape faces;
   wherein a first face among said more than one octagon shape faces has a hole;
   wherein said hole is located at center of said first face among said more than one octagon shape faces;
   wherein said hole's cross section is octagon shaped;
   wherein said hole's shaft's direction has a 30 degree angle with respect to perpendicular line to said first face among said more than one octagon shape faces;
   wherein a bar or arm is configured to go in to said hole and get connected to said connector joint device; with said bar's or arm's head snapped and locked in.

16. The connector joint device for connecting rods or arms at a joint or intersection as recited in claim 15, wherein said hole has a gap or niche or opening or recess, for said bar's or arm's head.

* * * * *